United States Patent
Zhou et al.

(10) Patent No.: US 12,225,460 B2
(45) Date of Patent: Feb. 11, 2025

(54) UPDATE OF PHYSICAL DOWNLINK CONTROL CHANNEL (PDCCH) PARAMETERS

(71) Applicant: QUALCOMM INCORPORATED, San Diego, CA (US)

(72) Inventors: Yan Zhou, San Diego, CA (US); Iyab Issam Sakhnini, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 233 days.

(21) Appl. No.: 17/249,251

(22) Filed: Feb. 24, 2021

(65) Prior Publication Data

US 2021/0266831 A1 Aug. 26, 2021

Related U.S. Application Data

(60) Provisional application No. 62/981,974, filed on Feb. 26, 2020.

(51) Int. Cl.
| | |
|---|---|
| *H04W 52/02* | (2009.01) |
| *H04W 72/0446* | (2023.01) |
| *H04W 72/21* | (2023.01) |
| *H04W 72/23* | (2023.01) |
| *H04W 72/51* | (2023.01) |

(52) U.S. Cl.
CPC ... *H04W 52/0216* (2013.01); *H04W 72/0446* (2013.01); *H04W 72/21* (2023.01); *H04W 72/23* (2023.01); *H04W 72/51* (2023.01)

(58) Field of Classification Search
CPC ......... H04W 52/0216; H04W 72/0446; H04W 72/048; H04W 72/1284; H04W 72/14; H04W 72/23; H04W 72/21; H04W 72/51
See application file for complete search history.

(56) References Cited

U.S. PATENT DOCUMENTS

| | | | | |
|---|---|---|---|---|
| 10,027,460 | B2 * | 7/2018 | McBeath | H04L 5/0053 |
| 2015/0110059 | A1 * | 4/2015 | Bai | H04L 5/0091 |
| | | | | 370/329 |
| 2018/0049168 | A1 * | 2/2018 | Ryu | H04L 5/0044 |
| 2018/0376498 | A1 * | 12/2018 | Bhattad | H04L 1/1819 |
| 2019/0223164 | A1 * | 7/2019 | He | H04L 25/0204 |
| 2019/0274032 | A1 * | 9/2019 | Chatterjee | H04W 72/0466 |
| 2020/0092073 | A1 * | 3/2020 | Papasakellariou | H04L 5/0094 |
| 2020/0389847 | A1 * | 12/2020 | Deng | H04W 52/0219 |
| 2021/0112572 | A1 * | 4/2021 | Saber | H04L 5/0064 |
| 2022/0104201 | A1 * | 3/2022 | Takeda | H04W 72/02 |
| 2022/0110184 | A1 * | 4/2022 | Jeon | H04W 74/006 |
| 2022/0201520 | A1 * | 6/2022 | Zhou | H04L 5/005 |
| 2022/0225393 | A1 * | 7/2022 | Gao | H04L 5/001 |

* cited by examiner

*Primary Examiner* — Jasper Kwoh
(74) *Attorney, Agent, or Firm* — Haynes and Boone, LLP

(57) ABSTRACT

Wireless communications systems and methods related to updating a physical downlink control channel (PDCCH) monitoring parameter are provided. A user equipment (UE) determines a PDCCH monitoring parameter based on a current operating parameter. The UE transmits a PDCCH monitoring configuration request including the PDCCH monitoring parameter to a base station (BS). The BS may adjust the PDCCH monitoring parameter in accordance with the PDCCH monitoring configuration request. The UE may monitor PDCCH based on the PDCCH monitoring parameter.

22 Claims, 11 Drawing Sheets

UPDATE OF PHYSICAL DOWNLINK CONTROL CHANNEL (PDCCH) PARAMETERS

CROSS REFERENCE TO RELATED APPLICATIONS & PRIORITY CLAIM

The present application claims priority to and the benefit of U.S. Provisional Patent Application No. 62/981,974 filed Feb. 26, 2020, which is hereby incorporated by reference in its entirety as if fully set forth below and for all applicable purposes.

TECHNICAL FIELD

The present disclosure is directed to wireless communication systems and methods. Certain embodiments can enable and provide techniques allowing communication device efficiency by updating physical downlink control channel (PDCCH) parameters.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

A control resource set (CORESET) may carry physical downlink control channel (PDCCH). To detect a PDCCH signal, a UE may perform blind detection of PDCCH. If the UE detects a PDCCH signal in the CORESET, the UE may decode the PDCCH signal. It may be time consuming for the UE to perform blind detection. As the UE searches more PDCCH candidates, the decoding complexity may increase. The UE may consume more power when the decoding complexity increases.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an additional aspect of the disclosure, a method of wireless communication includes determining, by a user equipment (UE), a physical downlink control channel (PDCCH) monitoring parameter based on a current operating parameter; transmitting, by the UE to a base station (BS), a PDCCH monitoring configuration request including the PDCCH monitoring parameter; and monitoring, by the UE, PDCCH based on the PDCCH monitoring parameter.

In an additional aspect of the disclosure, an apparatus includes a memory; a processor coupled with the memory and configured to, when executing instructions stored on the memory, cause the apparatus to: determine, by a user equipment (UE), a physical downlink control channel (PDCCH) monitoring parameter based on a current operating parameter; and monitor, by the UE, PDCCH based on the PDCCH monitoring parameter; and a transceiver configured to: transmit, by the UE to a base station (BS), a PDCCH monitoring configuration request including the PDCCH monitoring parameter.

In an additional aspect of the disclosure, a computer-readable medium having program code recorded thereon, the program code including code for causing a user equipment (UE) to determine a physical downlink control channel (PDCCH) monitoring parameter based on a current operating parameter; code for causing the UE to transmit to a base station (BS), a PDCCH monitoring configuration request including the PDCCH monitoring parameter; and code for causing the UE to monitor, by the UE, PDCCH based on the PDCCH monitoring parameter.

In an additional aspect of the disclosure, an apparatus includes means for determining, by a user equipment (UE), a physical downlink control channel (PDCCH) monitoring parameter based on a current operating parameter; means for transmitting, by the UE to a base station (BS), a PDCCH monitoring configuration request including the PDCCH monitoring parameter; and means for monitoring, by the UE, PDCCH based on the PDCCH monitoring parameter.

In an additional aspect of the disclosure, a method of wireless communication includes determining, by a base station (BS), a physical downlink control channel (PDCCH) monitoring parameter based on a current operating parameter; transmitting, by the BS to a user equipment (UE), a PDCCH monitoring configuration update including the PDCCH monitoring parameter; and transmitting, by the BS to the UE, a PDCCH signal based on the PDCCH monitoring configuration update.

In an additional aspect of the disclosure, an apparatus includes a memory; a processor coupled with the memory and configured to, when executing instructions stored on the memory, cause the apparatus to: determine, by a base station (BS), a physical downlink control channel (PDCCH) monitoring parameter based on a current operating parameter; and a transceiver configured to: transmit, by the BS to a user equipment (UE), a PDCCH monitoring configuration update including the PDCCH monitoring parameter; and transmit, by the BS to the UE, a PDCCH signal based on the PDCCH monitoring configuration update.

In an additional aspect of the disclosure, a computer-readable medium having program code recorded thereon, the program code including code for causing a base station (BS) to determine a physical downlink control channel (PDCCH) monitoring parameter based on a current operating parameter; code for causing the BS to transmit to a user equipment (UE), a PDCCH monitoring configuration update including the PDCCH monitoring parameter; and code for causing the BS to transmit to the UE, a PDCCH signal based on the PDCCH monitoring configuration update.

In an additional aspect of the disclosure, an apparatus includes means for determining, by a base station (BS), a physical downlink control channel (PDCCH) monitoring parameter based on a current operating parameter; means for transmitting, by the BS to a user equipment (UE), a PDCCH monitoring configuration update including the PDCCH monitoring parameter; and means for transmitting, by the BS to the UE, a PDCCH signal based on the PDCCH monitoring configuration update.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
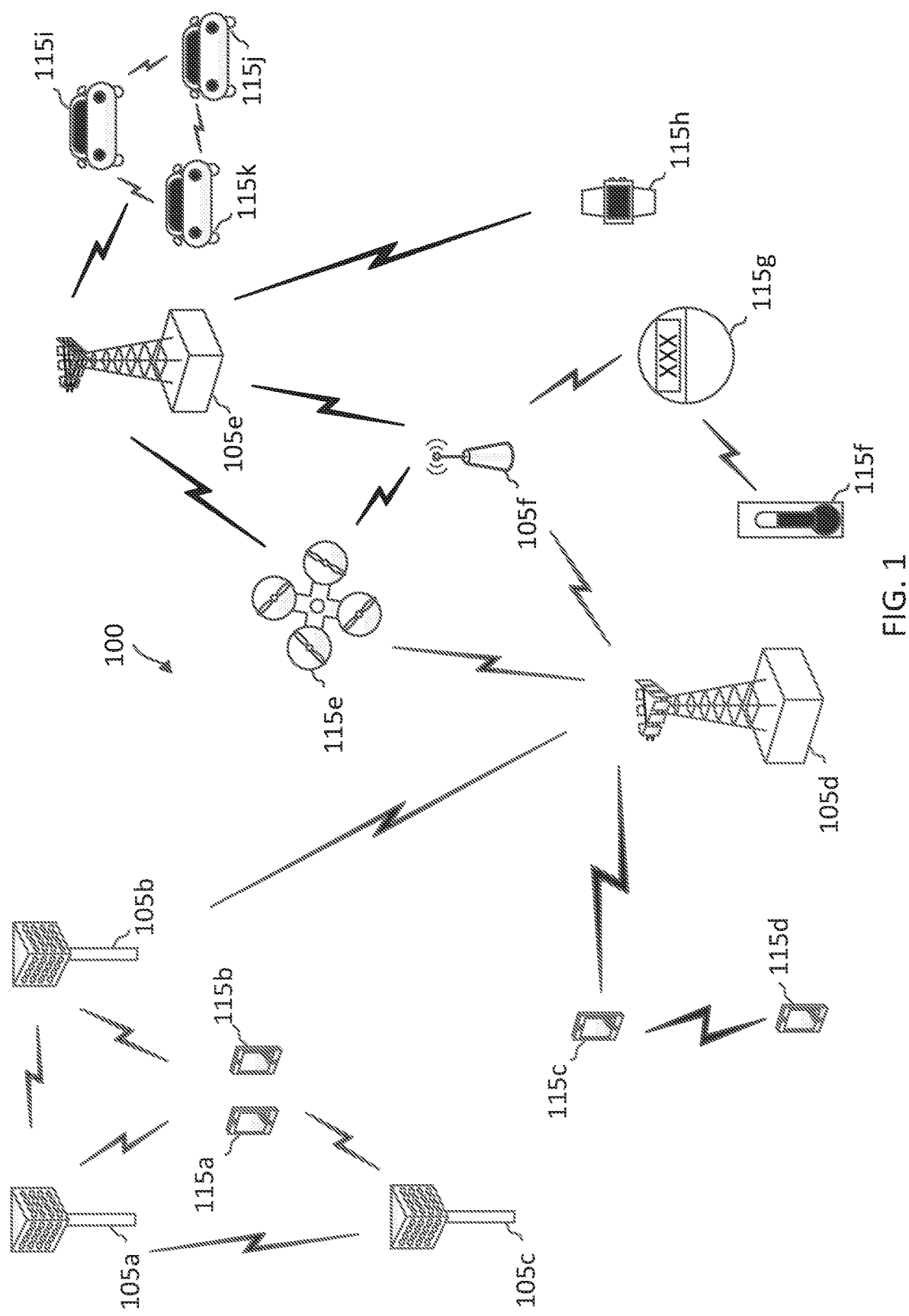
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A control resource set (CORESET) may carry physical downlink control channel (PDCCH). To detect a PDCCH signal, a UE may perform blind detection of PDCCH. For example, the UE may monitor PDCCH based on a PDCCH monitoring parameter. The PDCCH monitoring parameter may include, for example, a maximum number of monitored PDCCH candidates per-slot that is supported by the UE, a maximum number of monitored PDCCH candidates per-span that is supported by the UE, a maximum number of non-overlapping control channel elements (CCEs) per-slot that is supported by the UE, and/or a maximum number of non-overlapping CCEs per-span that is supported by the UE. The span may have a periodicity and a duration specifying a period of time defined in terms of symbols. As the number of PDCCH candidates increases and/or the number of CCEs within a CORESET increases, the PDCCH decoding complexity may increase. With the increase in decoding complexity, the power consumption at the UE may also increase.

The present application describes mechanisms for reducing decoding complexity of blind detection and/or reducing power consumption at the UE. For example, the environment in which the UE operates may change over time. For example, channel conditions, payloads, and/or battery life experienced by the UE may change over time. To accommodate for these dynamic changes, the PDCCH monitoring parameter may be adjusted. For example, when channel conditions are noisy, a higher aggregation level of CCEs may provide a more reliable PDCCH performance, and thus the UE may reduce the PDCCH monitoring parameter value (e.g., the number of PDCCH candidates, the number of non-overlapped CCEs within a CORESET). In another example, when payload processed at the UE is heavy, a low communication latency is desired, and/or the battery life of the UE has fallen below a particular threshold, it may be desirable to reduce the PDCCH monitoring parameter value (e.g., the number of PDCCH candidates, the number of non-overlapped CCEs) to allow the UE to monitor a fewer number of PDCCH candidates and/or CCEs within a CORESET.

In another example, when channel conditions are clear (e.g., a high signal-to-noise ratio (SNR)), a lower aggregation level of CCEs may be used to provide a sufficient PDCCH performance, and thus and thus the UE may reduce the PDCCH monitoring parameter value (e.g., the number of PDCCH candidates, the number of non-overlapped CCEs). In another example, when payload processed at the UE is light, or a longer communication latency can be tolerated, and/or the battery life of the UE is above the particular threshold, the UE may be able to support a greater number of PDCCH blind decoding, and thus the UE may increase the PDCCH monitoring parameter value (e.g., the number of PDCCH candidates, the number of non-overlapped CCEs within a CORESET).

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a 1-DD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. After obtaining the MIB, the RMSI and/or the OSI, the UE 115 can perform a random access procedure to establish a connection with the BS 105. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant.

Figure 2:
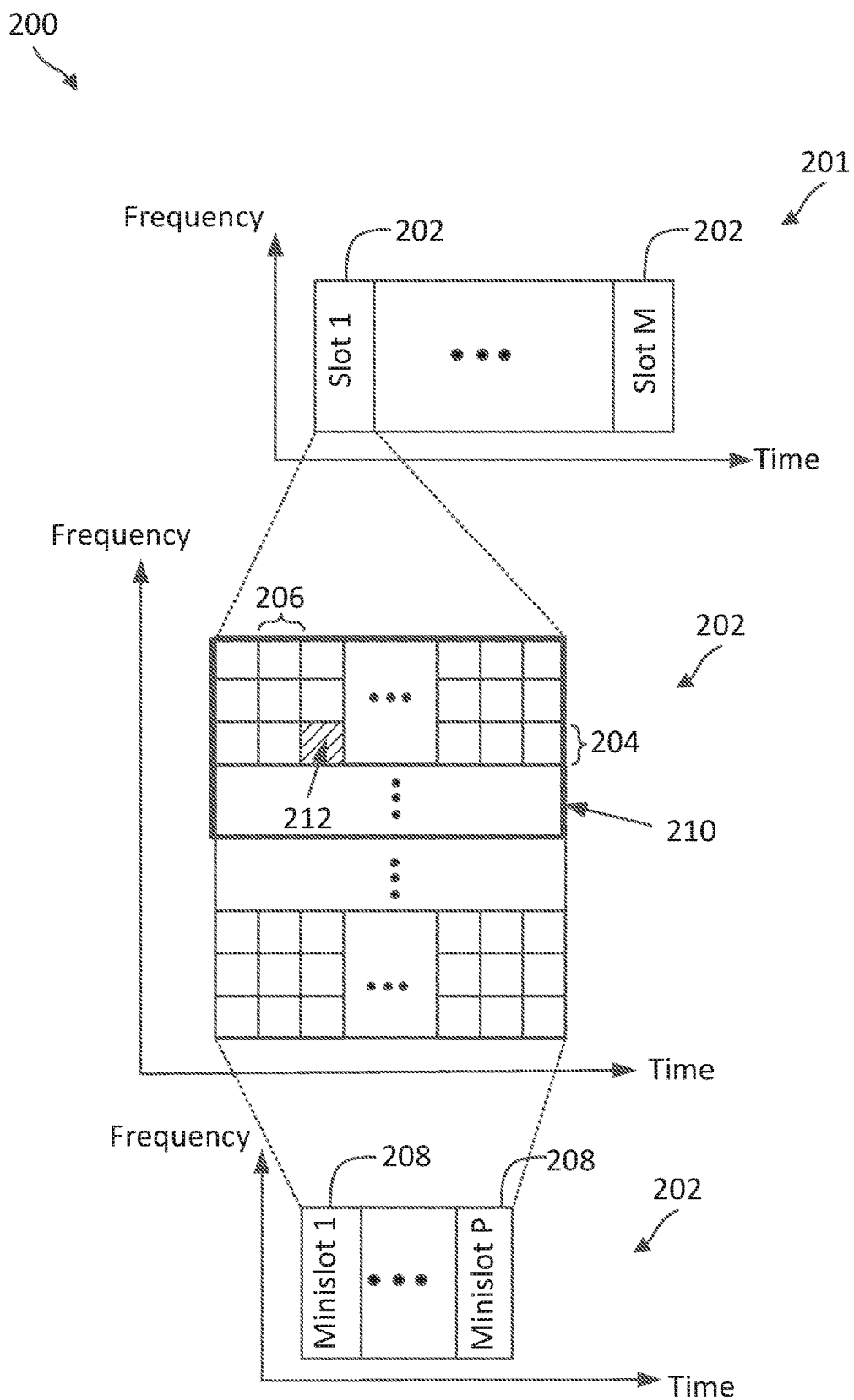
FIG. 2 is a timing diagram illustrating a transmission frame structure according to one or more aspects of the present disclosure.

FIG. 2 is a timing diagram illustrating a transmission frame structure 200 according to one or more aspects of the present disclosure. The transmission frame structure 200 may be employed by BSs such as the BSs 105 and UEs such as the UEs 115 in a network such as the network 100 for communications. In particular, the BS may communicate with the UE using time-frequency resources configured as shown in the transmission frame structure 200. In FIG. 2, the x-axes represent time in some arbitrary units, and the y-axes represent frequency in some arbitrary units.

The transmission frame structure 200 includes a radio frame 201. The duration of the radio frame 201 may vary depending on some aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on, for example, the channel bandwidth, the subcarrier spacing (SCS), and/or the cyclic-prefix (CP) mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time. A resource block group (RBG) may include one or more RBs. A subband may include multiple RBGs.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into P number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS 105 may schedule the UE 115 at a frequency-granularity of a RB 210 (e.g., including about 12 subcarriers 204).

Figure 3:
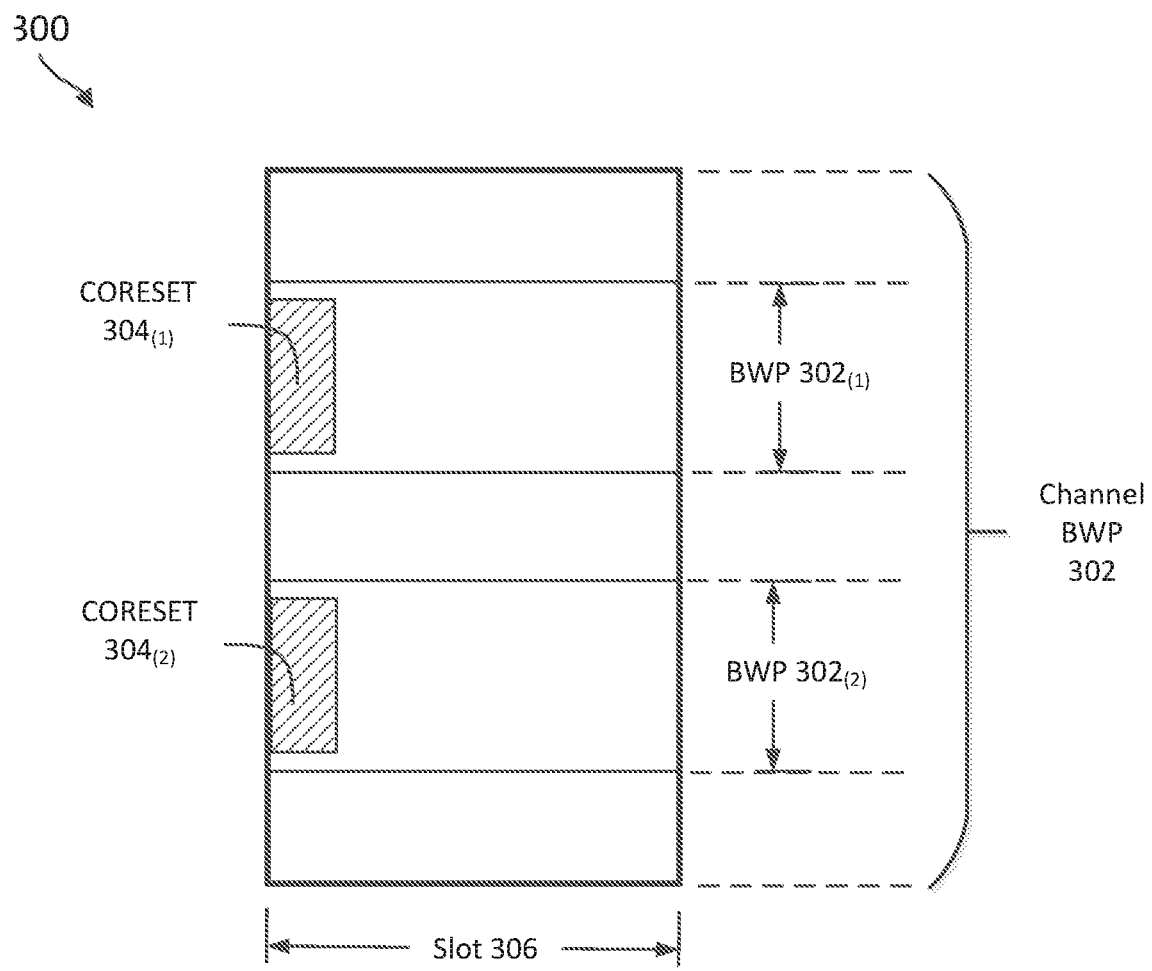
FIG. 3 is a timing diagram illustrating a control resource set (CORESET) configuration 300 according to one or more aspects of the present disclosure.

A CORESET is a set of physical time-frequency resources where PDCCH can be transmitted. FIG. 3 illustrates a CORESET configuration 300 according to one or more aspects of the present disclosure. The CORESET configuration 300 may be employed by BSs such as the BSs 105 and UEs such as the UEs 115 in a network such as the network 100 for communications. In particular, the BS may communicate with the UE by transmitting PDCCH using the CORESET configuration 300. In FIG. 3, the x-axis represents time in some arbitrary units, and the y-axis represents frequency in some arbitrary units.

In some aspects, the network 100 may operate over a channel BW 302 or a component carrier (CC) BW. The network 100 may partition the channel BW 302 into multiple BWPs (e.g., portions) $302_{(1)}$ and $302_{(2)}$. A BS 105 may dynamically assign a UE 115 to operate over a certain BWP (e.g., a certain portion of the system BW). For example, the BS 105 may dynamically assign the UE 115 to operate over the BWPs $302_{(1)}$ and $302_{(2)}$. The assigned BWP may be referred to as the active BWP. The UE 115 may monitor the active BWP(s) for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications. A BWP may also be referred to as a subband.

A CORESET may occur at any position within the slot 306 and anywhere in the frequency range of the BWP $302_{(1)}$, $302_{(2)}$. The BS 105 may configure a UE 115 with a CORESET $304_{(1)}$, $304_{(2)}$ for a UE 115 to monitor for PDCCH transmissions from the BS 105. For example, a CORESET $304_{(1)}$ may carry a PDCCH in the BWP $302_{(1)}$ in a slot 306, and a CORESET $304_{(2)}$ may carry a PDCCH in the BWP $302_{(2)}$ in the slot 306.

In some examples, a UE 115 may provide a capability report to the BS 105, where the capability report specifies a first value for a PDCCH monitoring parameter. The PDCCH monitoring parameter may include a maximum number of monitored PDCCH candidates per-slot that is supported by the UE, a maximum number of monitored PDCCH candidates per-span that is supported by the UE, a maximum number of non-overlapping control channel elements (CCEs) per-slot that is supported by the UE, a maximum number of non-overlapping CCEs per-span that is supported by the UE. The span may have a periodicity and a duration specifying a period of time defined in terms of symbols. Additionally, the span may be configurable by the BS.

The UE 115 may perform blind detection in the CORESET $304_{(1)}$ within the BWP $302_{(1)}$ for PDCCH and in the CORESET $304_{(2)}$ within the BWP $302_{(2)}$ for PDCCH in accordance with the first value for a PDCCH monitoring parameter. For example, the UE 115 may monitor PDCCH based on the first value for a PDCCH monitoring parameter. The UE 115 may determine whether a CORESET carries a PDCCH signal based on whether any of the blind decoding is successful. For instance, if the BS 105 transmitted a PDCCH signal in the CORESET $304_{(1)}$, the UE 115 may successfully decode a PDCCH signal in the CORESET $304_{(1)}$, the UE may fail PDCCH decoding in the CORESET $304_{(1)}$. If the BS 105 transmitted a PDCCH signal in the CORESET $304_{(2)}$, the UE 115 may successfully decode a PDCCH signal in the CORESET $304_{(2)}$. If the BS 105 did not transmit any PDCCH signal in the CORESET $304_{(2)}$, the UE may fail PDCCH decoding in the CORESET $304_{(2)}$.

In some examples, the UE 115 may detect a change to the environment in which the UE 115 is operating and accordingly may determine to change or adjust the PDCCH monitoring parameter by setting the PDCCH monitoring parameter to a second value different from the first value. The second value may be, for example, greater than or less than the first value. The UE 115 may transmit a PDCCH monitoring configuration request including the PDCCH monitoring parameter, where the PDCCH monitoring configuration request is a request to set the PDCCH monitoring parameter to the second value. The BS 105 may reject, accept, or modify the PDCCH monitoring configuration request. For example, if the BS 105 rejects the PDCCH monitoring configuration request, the UE 115 may continue to monitor PDCCH based on the first value for the PDCCH monitoring parameter. In another example, if the BS 105 accepts the PDCCH monitoring configuration request, the UE 115 may monitor PDCCH based on the second value for the PDCCH monitoring parameter. In another example, if the BS 105 modifies the PDCCH monitoring configuration request, the BS 105 may set the PDCCH monitoring parameter to a third value and transmit this update to the UE 115. The UE 115 may then monitor PDCCH based on the third value for the PDCCH monitoring parameter.

Each BWP may be identified by a BWP identifier. The BS 105 may apply the acceptance, rejection, and/or modification of the PDCCH monitoring parameter to an indicated BWP (e.g., by including the BWP identifier of the indicated BWP), to a currently active DL BWP (e.g., BWP $302_{(1)}$), or to a set of BWPs (e.g., BWP $302_{(1)}$ and BWP $302_{(2)}$). In some examples, the BS 105 may transmit a PDCCH monitoring configuration update indicating the acceptance, rejection, and/or modification of the PDCCH monitoring parameter.

In some examples, the BS 105 may transmit a PDCCH monitoring configuration update including the PDCCH monitoring parameter. In an example, the BS 105 may detect a change to a current operating parameter at the BS and/or the UE and accordingly determine to adjust the PDCCH monitoring parameter. In this example, the BS 105 may transmit the PDCCH monitoring configuration update indicating that the PDCCH monitoring parameter has been adjusted. In another example, the BS 105 may transmit the PDCCH monitoring configuration update to the UE 115 in response to the UE's PDCCH monitoring configuration request.

The size and location of a CORESET may be semi-statically configured by the network 100 and may be set to be smaller than the subband bandwidth. A PDCCH transmission may occupy part or all of the CORESET frequency location at a defined time instance. A UE is not expected to handle CORESETs outside of its active subband. A CORESET may or may not span the entire bandwidth. The BS 105 may transmit PDCCH in specifically designed CORESET region to a specific region in the frequency domain.

A CORESET 304 may span, for example, multiples of non-contiguous or contiguous groups of six RBs in frequency and between one and three contiguous OFDM symbols in time. In the time domain, a CORESET may be up to three OFDM symbols in duration and located anywhere within a slot (e.g., at a beginning of the slot 306). In the frequency domain, a CORESET may be defined in multiples of six RBs up to the system carrier frequency bandwidth or the subband bandwidth (when the system bandwidth is partitioned into subbands). For example, PDCCH may be mapped continuously or non-contiguously in frequency with localized or distributed mapping of RE groups (REGs) to a control channel element (CCE) (in the physical domain). The REs in a CORESET are organized in REGs, and the basic unit for a CORESET is a REG. Each REG may include, for example, twelve REs of one OFDM symbol in one RB. A PDCCH may be confined to one CORESET and transmitted with its own demodulation reference signal (DMRS) enabling UE-specific beamforming of the control channel.

Figure 4:
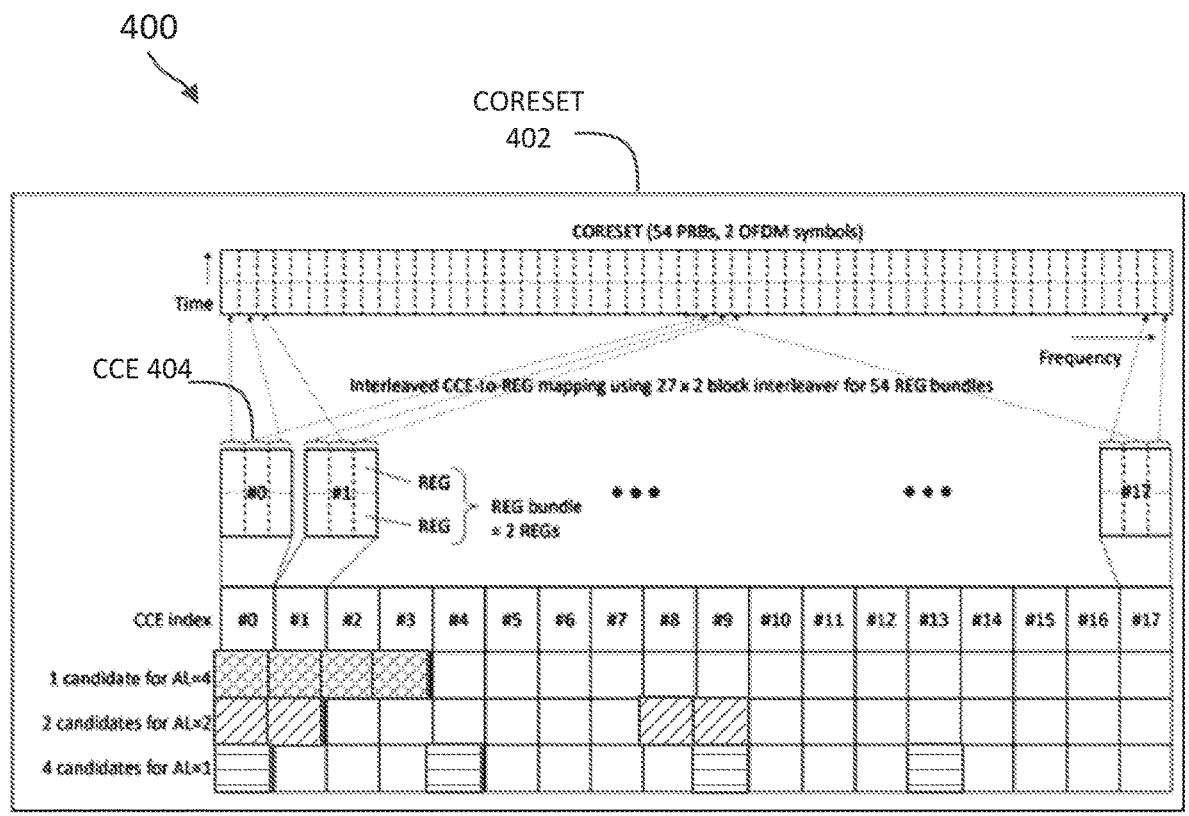
FIG. 4 is a diagram illustrating a mapping of physical downlink control channel (PDCCH)-to-CORESET configuration according to one or more aspects of the present disclosure.

FIG. 4 is a diagram illustrating a mapping of PDCCH-to-CORESET configuration 400 according to one or more aspects of the present disclosure. The mapping of PDCCH-to-CORESET configuration 400 may be employed by BSs such as the BSs 105 and UEs such as the UEs 115 in a network such as the network 100 for communications. In FIG. 4, the x-axis represents frequency in some arbitrary units, and the y-axis represents time in some arbitrary units.

In the example illustrated in FIG. 4, a CORESET 402 is composed of 54 PRBs spanning two OFDM symbols. Each CCE 404 may include six REGs. A PDCCH may be carried by one, two, four, eight, or sixteen CCEs to accommodate different DCI payload size or different coding rates. An aggregation level indicates the number of CCEs allocated for a PDCCH. A DCI of aggregation level L includes L continuously numbered CCEs, and the CCEs are mapped on a number of REGs in a CORESET. For example, an aggregation level of one may indicate that one CCE is allocated for a PDCCH, an aggregation level of two may indicate that two CCEs are allocated for a PDCCH, an aggregation level of four may indicate that four CCEs are allocated for a PDCCH, an aggregation level of eight may indicate that eight CCEs are allocated for a PDCCH, and an aggregation level of sixteen may indicate that sixteen CCEs are allocated for a PDCCH.

The network (e.g., an NR network) may support distributed and localized resource allocation for a DCI in a CORESET by configuring interleaved or non-interleaved CCE-to-REG mapping for each CORESET. For interleaved CCE-to-REG mapping, REG bundles constituting the CCEs for a PDCCH are distributed in the frequency domain in units of REG bundles as shown in FIG. 4. The CCE-to-REG mapping for a CORESET can be interleaved (for frequency diversity) or non-interleaved (for localized beam-forming). A REG bundle may refer to a set of indivisible resources including neighboring REGs. A REG bundle spans across all OFDM symbols for a given CORESET. Accordingly, interleaved CCE-to-REG mapping may enable both a time domain processing gain and frequency domain diversity. Interleaved CCE-to-REG mapping may be visualized as a process for which REG bundle indices are continuously filled in an array row-wise first and then read out column-wise, which may be referred to as block interleaving. In contrast, for non-interleaved CCE-to-REG mapping, all CCEs for a DCI with aggregation level L are mapped in consecutive REG bundles of the CORESET. Once the REGs corresponding to a PDCCH are determined, the modulated symbols of the PDCCH may be mapped to the REs of the determined REGs in the frequency domain first and the time domain second, i.e. in increasing order of the RE index and symbol index, respectively.

A CCE is the unit upon which a search space (SS) for blind decoding is defined. To detect a PDCCH signal, the UE 115 may perform blind detection of PDCCH in one or more SSs. As the number of PDCCH candidates and/or the number of non-overlapping CCEs within a CORESET increases, the decoding complexity at the UE 115 may increase. The number of non-overlapping CCEs in a slot or a span may indicate the number of PDCCH candidates (e.g., the number of blind decoding) the UE 115 may decode for in the slot or span.

A CORESET may carry multiple PDCCH signals. The UE 115 may transmit a capability report to the UE specifying a PDCCH monitoring parameter. For example, the PDCCH monitoring parameter include a maximum number of monitored PDCCH candidates per-slot within a CORESET that the UE 115 is able to search, a maximum number of monitored PDCCH candidates per-span that the UE 115 is able to search, includes a maximum number of non-overlapping control channel elements (CCEs) per-slot within a CORESET that the UE 115 is able to search, and/or a maximum number of non-overlapping CCEs per-span that the UE 115 is able to search. The span may have a periodicity and a duration specifying a period of time defined in terms of symbols. A span may include multiple CORESETs, and a CORESET may include multiple PDCCH candidates, aggregation levels, etc. The UE 115 may perform blind detection and attempt by brute force to decode the PDCCH signals.

The present disclosure provides techniques for the UE 115 to dynamically or periodically update the BS 105 on the PDCCH monitoring parameter related the PDCCH monitoring complexity. For example, the UE 115 may transmit a PDCCH monitoring configuration request to adjust the PDCCH monitoring parameter. If the BS 105 accepts the PDCCH monitoring configuration request, the UE 115 may adjust its blind detection process based on the updated PDCCH monitoring parameter. The present disclosure also provides techniques for the BS 105 to dynamically or periodically update the PDCCH monitoring parameter and inform the UE of the update so that the UE 115 may adjust its blind detection process based on the update.

Figure 5:
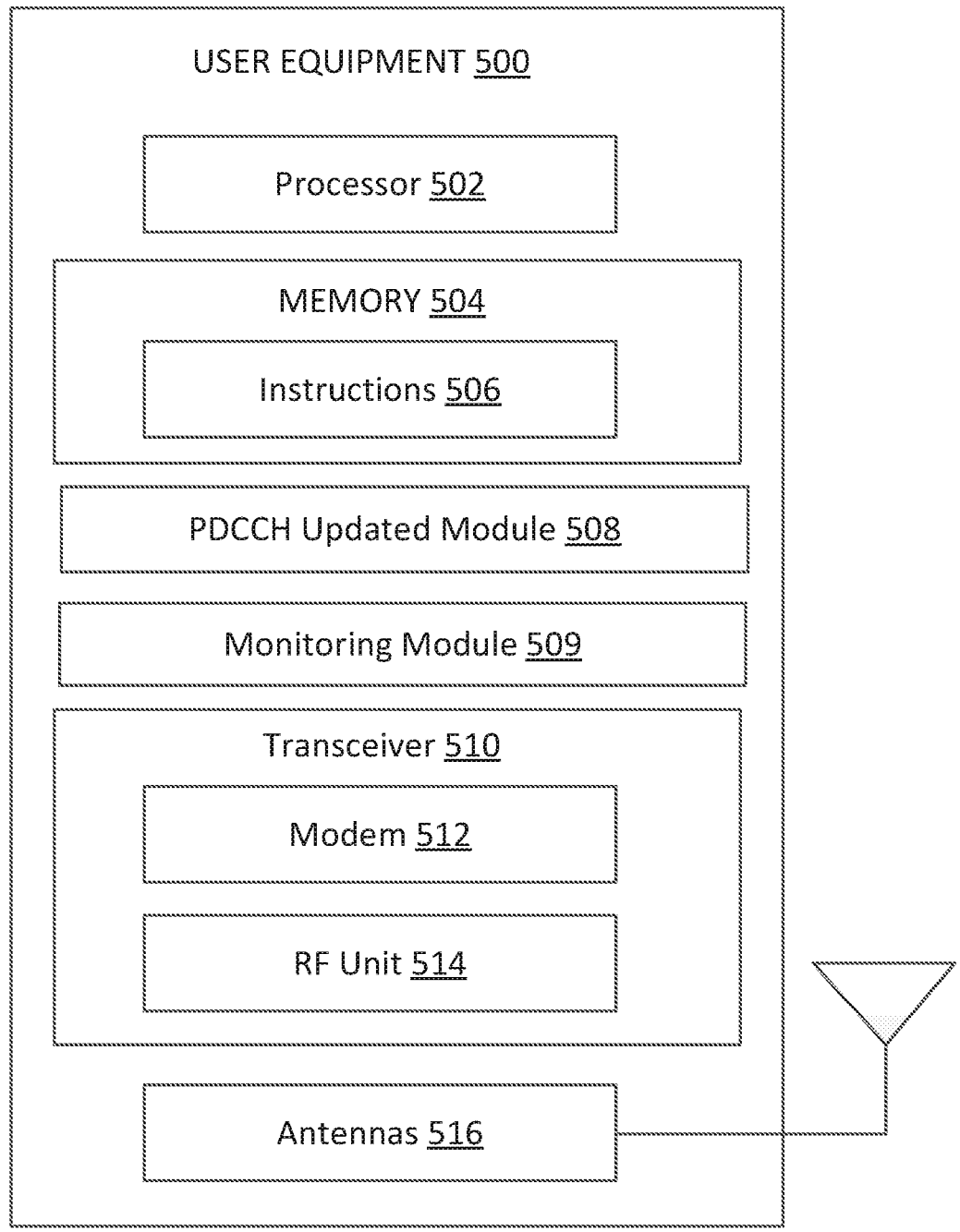
FIG. 5 is a block diagram of a user equipment (UE) according to one or more aspects of the present disclosure.

FIG. 5 is a block diagram of an example UE 500 according to one or more aspects of the present disclosure. The UE 500 may be a UE 115, a UE 715, and/or a UE 815 as discussed above in FIGS. 1, 7, and/or 8, respectively. As shown, the UE 500 may include a processor 502, a memory 504, a PDCCH update module 508, a monitoring module 509, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 (e.g., UE 715 and/or UE 815)) in connection with aspects of the present disclosure, for example, aspects of FIGS. 1, 2, 3, 4, 5, 7, 8, 9, and/or 10. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The PDCCH update module 508 and/or the monitoring module 509 may be implemented via hardware, software, or combinations thereof. For example, the PDCCH update module 508 and/or the monitoring module 509 may be implemented as a processor, circuit, and/or instructions 506 stored in the memory 504 and executed by the processor 502. In some instances, the PDCCH update module 508 and/or the monitoring module 509 can be integrated within the modem subsystem 512. For example, the PDCCH update module 508 and/or the monitoring module 509 can be implemented by a combination of software components (e.g., executed by a DSP or a general processor) and hardware components (e.g., logic gates and circuitry) within the modem subsystem 512.

The PDCCH update module 508 and/or the monitoring module 509 may be used for various aspects of the present disclosure, for example, aspects of FIGS. 1, 2, 3, 4, 7, 8, 9, and/or 10. In some aspects, the PDCCH update module 508 may be configured to determine a PDCCH monitoring parameter based on a current operating parameter. The PDCCH update module 508 may be configured to transmit to a BS, a PDCCH monitoring configuration request including the PDCCH monitoring parameter. The monitoring module 509 may be configured to monitor PDCCH based on the PDCCH monitoring parameter.

The PDCCH monitoring configuration request may include a request to set the PDCCH monitoring parameter to a different value. The PDCCH monitoring parameter may include a maximum number of monitored PDCCH candidates per-slot that is supported by the UE, a maximum number of monitored PDCCH candidates per-span that is supported by the UE, a maximum number of non-overlapping CCEs per-slot that is supported by the UE, and/or a maximum number of non-overlapping CCEs per-span that is supported by the UE. The span may have a periodicity and a duration specifying a period of time defined in terms of symbols.

As shown, the transceiver 510 may include the modem subsystem 512 and the RF unit 514. The transceiver 510 can be configured to communicate bi-directionally with other devices, such as the BSs 105, the BS 600, the BS 705, the BS 805, and/or another core network element. The modem subsystem 512 may be configured to modulate and/or encode the data from the memory 504, the PDCCH update module 508 and/or the monitoring module 509 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., values for the PDCCH monitoring parameter, PDCCH monitoring configuration request, response to the PDCCH monitoring configuration request, capability report, current operating parameter, etc.) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., values for the PDCCH monitoring parameter, PDCCH monitoring configuration request, response to the PDCCH monitoring configuration request, capability report, current operating parameter, etc.) to the PDCCH update module 508 and/or the monitoring module 509 for processing. The antennas 516 may include multiple antennas of similar or different designs in order to sustain multiple transmission links. The RF unit 514 may configure the antennas 516.

In an aspect, the transceiver 510 may coordinate with the PDCCH update module 508 to transmit to the BS, a PDCCH monitoring configuration request including the PDCCH monitoring parameter. In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
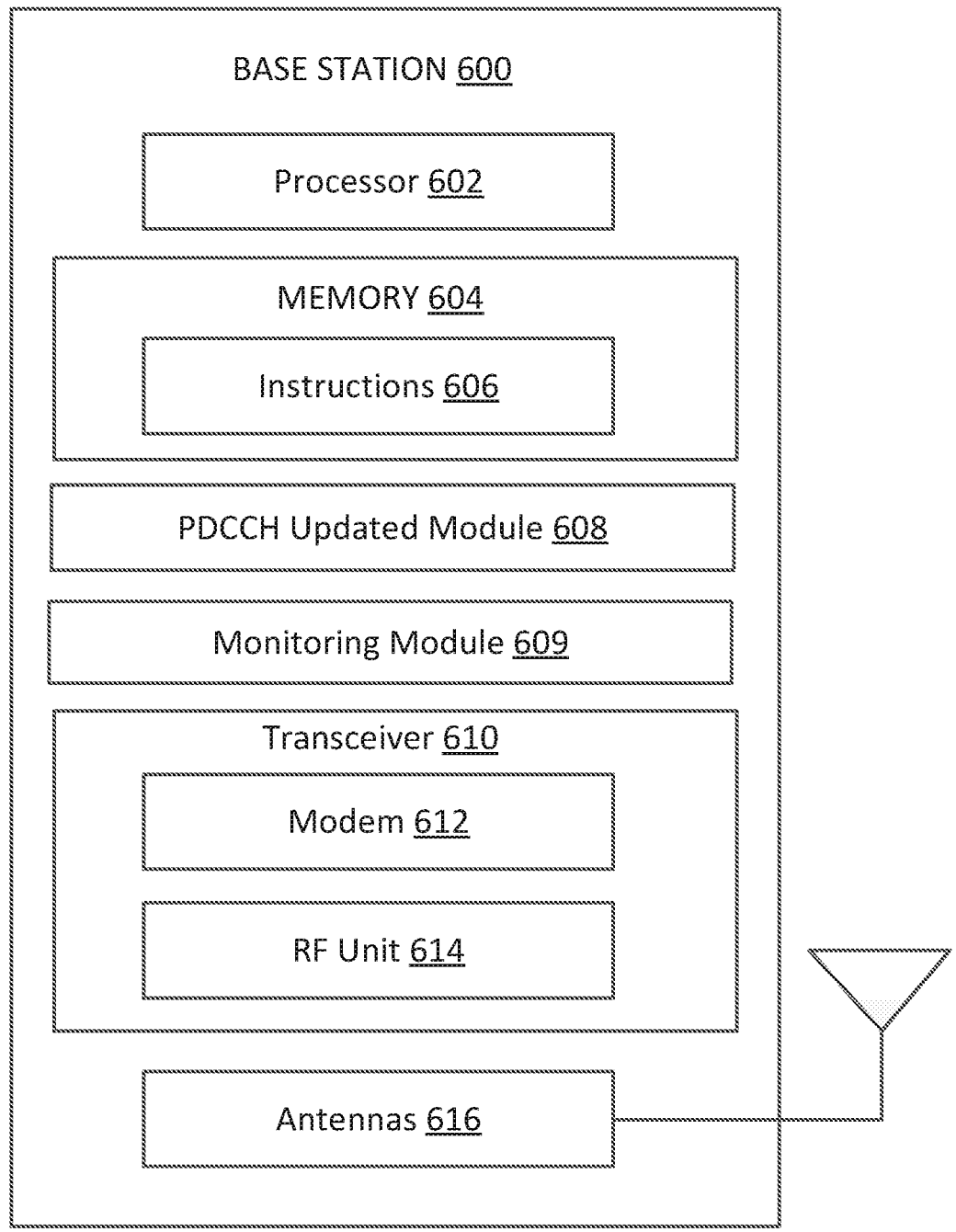
FIG. 6 is a block diagram of a base station (BS) according to one or more aspects of the present disclosure.

FIG. 6 is a block diagram of an example BS 600 according to one or more aspects of the present disclosure. The BS 600 may be a BS 105, BS 705, and/or BS 805 as discussed above in FIGS. 1, 7, and/or 8, respectively. As shown, the BS 600 may include a processor 602, a memory 604, a PDCCH update module 608, a monitoring module 609, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1, 2, 3, 4, 7, 8, and/or 11. Instructions 606 may also be referred to as code, which may be interpreted broadly to include any type of computer-readable statement(s) as discussed above with respect to FIG. 5.

The PDCCH update module 608 and/or the monitoring module 609 may be implemented via hardware, software, or combinations thereof. For example, the PDCCH update module 608 and/or the monitoring module 609 may be implemented as a processor, circuit, and/or instructions 606 stored in the memory 604 and executed by the processor 602. In some instances, the PDCCH update module 608 and/or the monitoring module 609 can be integrated within the modem subsystem 612. For example, the PDCCH update module 608 and/or the monitoring module 609 can be implemented by a combination of software components (e.g., executed by a DSP or a general processor) and hardware components (e.g., logic gates and circuitry) within the modem subsystem 612.

The PDCCH update module 608 and/or the monitoring module 609 may be used for various aspects of the present disclosure, for example, aspects of FIGS. 1, 2, 3, 4, 7, 8, and/or 11. In some aspects, the PDCCH update module 608 may be configured to determine a PDCCH monitoring parameter based on a current operating parameter. The PDCCH update module 608 may be configured to transmit a PDCCH monitoring configuration update including the PDCCH monitoring parameter. The monitoring module 609 may be configured to transmit a PDCCH signal based on the PDCCH monitoring configuration update.

The PDCCH monitoring configuration update may specify a different value for the PDCCH monitoring parameter. The PDCCH monitoring parameter may include a maximum number of monitored PDCCH candidates per-slot that is supported by the UE, a maximum number of monitored PDCCH candidates per-span that is supported by the UE, a maximum number of non-overlapping CCEs per-slot that is supported by the UE, and/or a maximum number of non-overlapping CCEs per-span that is supported by the UE. The span may have a periodicity and a duration specifying a period of time defined in terms of symbols.

As shown, the transceiver 610 may include the modem subsystem 612 and the RF unit 614. The transceiver 610 can be configured to communicate bi-directionally with other devices, such as the UE 115, the UE 500, the UE 715, and/or the UE 815, and/or another core network element. The modem subsystem 612 may be configured to modulate and/or encode data according to a MCS, e.g., a LDPC coding scheme, a turbo coding scheme, a convolutional coding scheme, a polar coding scheme, a digital beamforming scheme, etc. The RF unit 614 may be configured to process (e.g., perform analog to digital conversion or digital to analog conversion, etc.) modulated/encoded data (e.g., values for the PDCCH monitoring parameter, PDCCH monitoring configuration request, response to the PDCCH monitoring configuration request, capability report, current operating parameter, etc.) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., values for the PDCCH monitoring parameter, PDCCH monitoring configuration request, response to the PDCCH monitoring configuration request, capability report, current operating parameter, etc.) to the PDCCH update module 608 and/or the monitoring module 609 for processing. The antennas 616 may include multiple antennas of similar or different designs in order to sustain multiple transmission links.

In an aspect, the transceiver 610 may coordinate with the PDCCH update module 608 to transmit to the UE, a PDCCH monitoring configuration update including the PDCCH monitoring parameter and/or a PDCCH signal based on the PDCCH monitoring configuration update. In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
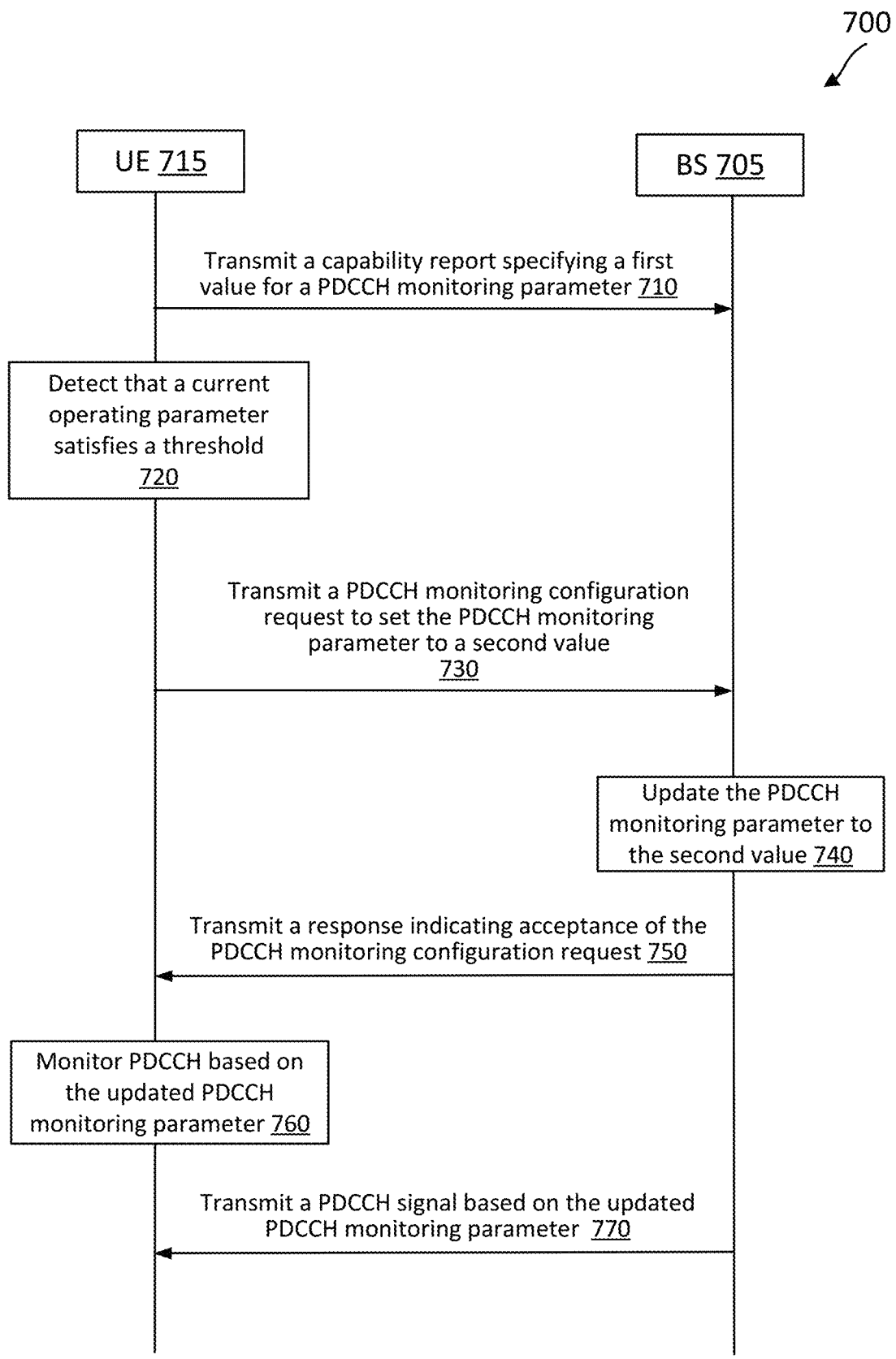
FIG. 7 is a signaling diagram illustrating a method of updating a PDCCH monitoring parameter according to one or more aspects of the present disclosure.

FIG. 7 is a signaling diagram illustrating a method 700 of updating a PDCCH monitoring parameter according to one or more aspects of the present disclosure. The method 700 may be implemented between a UE 715 and a BS 705 (e.g., located in the network 100). The UE 715 may correspond to UE 115 and/or UE 500, and the BS 705 may correspond to BS 105 and/or BS 600. The method 700 may employ similar PDCCH monitoring parameter update mechanisms as described with respect to FIGS. 1, 2, 3, 4, 5, 6, 8, 9, 10, and/or 11. As illustrated, the method 700 includes a number of enumerated actions, but aspects of the method 700 may include additional actions before, after, and in between the enumerated actions. In some aspects, one or more of the enumerated actions may be omitted or performed in a different order.

At action 710, the UE 715 may transmit a capability report specifying a first value for a PDCCH monitoring parameter. The PDCCH monitoring parameter may include a maximum number of monitored PDCCH candidates per-slot that is supported by the UE, a maximum number of monitored PDCCH candidates per-span that is supported by the UE, a maximum number of non-overlapping CCEs per-slot that is supported by the UE, and/or a maximum number of non-overlapping CCEs per-span that is supported by the UE. The span may have a periodicity and a duration specifying a period of time defined in terms of symbols. The BS 705 may configure the span. The BS 705 may receive the capability report.

At action 720, the UE 715 may detect that a current operating parameter satisfies a threshold. The current operating parameter may be any parameter that is related to current operations of the UE 715. For example, the current operating parameter may include at least one of channel characteristics experienced by the UE 715, battery usage at the UE 715, a remaining battery life at the UE 715, or traffic patterns at the UE 715. In an example, the UE 715 may have a battery life, and when the UE 715 detects that the battery life has fallen below a threshold, the UE 715 may detect that the current operating parameter satisfies the threshold. In another example, the UE 715 may measure a payload that is processing at the UE 715. When the UE 715 detects that the measured payload exceeds a threshold, the UE 715 may detect that the current operating parameter satisfies the threshold. In another example, the UE 715 may measure channel conditions. When the UE 715 detects that the channel condition quality exceeds a threshold (e.g., signal-to-noise ratio (SNR), reference signal receive power (RSRP)), the UE 715 may detect that the current operating parameter satisfies the threshold.

At action 730, the UE 715 may transmit a PDCCH monitoring configuration request to set the PDCCH monitoring parameter to a second value. The UE 715 may transmit the PDCCH monitoring configuration request in at least one of, for example, a media access control-control element (MAC-CE), a radio resource control (RRC) message, or an uplink control information (UCI).

The second value is different from the first value. In some examples, a power consumption by the UE 115 based on the PDCCH monitoring parameter being the second value is less than a power consumption by the UE based on the PDCCH monitoring parameter being the first value. For example, if the UE 115 is attempting to reduce its power consumption, the UE 115 may desire to adjust the PDCCH monitoring parameter to the second value to reduce the number of PDCCH candidates and/or the number of non-overlapping CCEs that the UE 115 supports when performing blind detection. In some examples, a power consumption by the UE based on the PDCCH monitoring parameter being the second value is greater than a power consumption by the UE based on the PDCCH monitoring parameter being the first value. For example, if the UE 115 can afford to increase its power consumption, the UE 115 may desire to adjust the PDCCH monitoring parameter to the second value to increase the number of PDCCH candidates and/or the number of non-overlapping CCEs that the UE 115 supports when performing blind detection.

The PDCCH monitoring configuration request may include a request to adjust at least one of the maximum number of monitored PDCCH candidates per-slot that is supported by the UE, the maximum number of monitored PDCCH candidates per-span that is supported by the UE, the maximum number of non-overlapping CCEs per-slot that is supported by the UE, and/or the maximum number of non-overlapping CCEs per-span that is supported by the UE.

The BS 705 may receive the PDCCH monitoring configuration request from the UE 715. At action 740, the BS 705 may update the PDCCH monitoring parameter to the second value. Accordingly, the BS 705 may adjust its transmissions in PDCCH based on the updated PDCCH monitoring parameter. At action 750, the BS 705 transmits a response indicating acceptance of the PDCCH monitoring configuration request. The UE 715 may receive the response from the BS 705.

At action 760, the UE 715 monitors PDCCH based on the updated PDCCH monitoring parameter. For example, after receiving the response from the BS 705, the UE 715 may adjust the maximum number of monitored PDCCH candidates per-slot that is supported by the UE, the maximum number of monitored PDCCH candidates per-span that is supported by the UE, the maximum number of non-overlapping CCEs per-slot that is supported by the UE, and/or the maximum number of non-overlapping CCEs per-span that is supported by the UE when monitoring PDCCH. At action 770, the BS transmits a PDCCH signal based on the updated PDCCH monitoring parameter.

Figure 8:
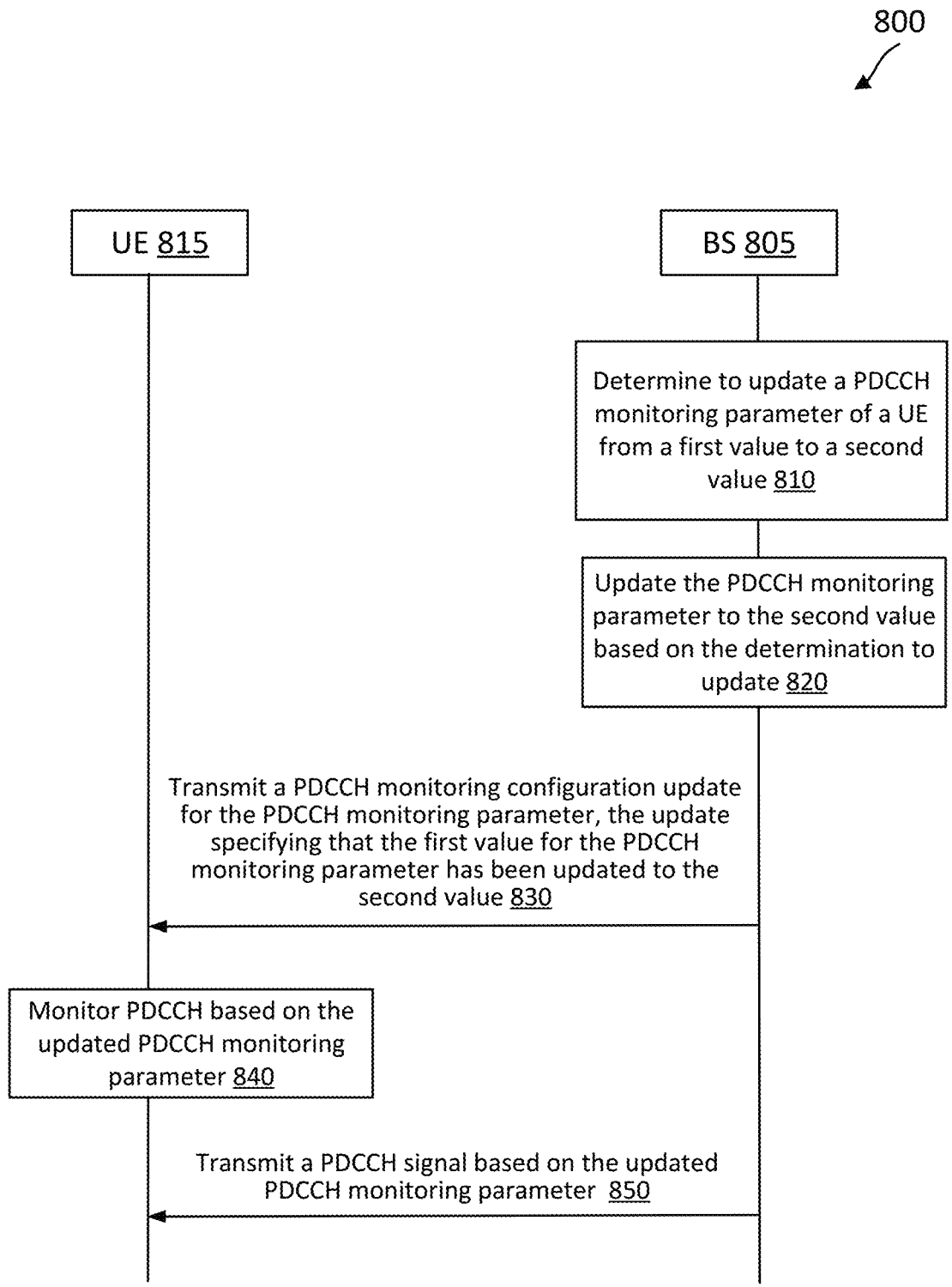
FIG. 8 is a signaling diagram illustrating a method of updating a PDCCH monitoring parameter according to one or more aspects of the present disclosure.

FIG. 8 is a signaling diagram illustrating a method 800 of updating a PDCCH monitoring parameter according to one or more aspects of the present disclosure. The method 800 may be implemented between a UE 815 and a BS 805 (e.g., located in the network 100). The UE 815 may correspond to UE 115, the UE 500 and/or the UE 715, and the BS 805 may correspond to BS 105, the BS 600, and/or the BS 705. The method 800 may employ similar PDCCH monitoring parameter update mechanisms as described with respect to FIGS. 1, 2, 3, 4, 5, 6, 7, 9, 10, and/or 11. As illustrated, the method 800 includes a number of enumerated actions, but aspects of the method 800 may include additional actions before, after, and in between the enumerated actions. In some aspects, one or more of the enumerated actions may be omitted or performed in a different order.

At action 810, the BS 805 may determine to update a PDCCH monitoring parameter of a UE 815 from a first value to a second value. The PDCCH monitoring parameter may include a maximum number of monitored PDCCH candidates per-slot that is supported by the UE, a maximum number of monitored PDCCH candidates per-span that is supported by the UE, a maximum number of non-overlapping CCEs per-slot that is supported by the UE, and/or a maximum number of non-overlapping CCEs per-span that is supported by the UE. The span may have a periodicity and a duration specifying a period of time defined in terms of symbols. The BS 805 may configure the span.

In an example, the BS 805 may determine to update the PDCCH monitoring parameter based on a current operating parameter (e.g., dynamic conditions that are related to the operation of the UE 815). In another example, the BS 805 may determine to update the PDCCH monitoring parameter in response to receiving a PDCCH monitoring configuration request from the UE (e.g., see action 730 in FIG. 7).

At action 820, the BS 805 may update the PDCCH monitoring parameter to the second value based on the determination to update. In some examples, a power consumption by the UE 815 based on the PDCCH monitoring parameter being the second value may be less than a power consumption by the UE 815 based on the PDCCH monitoring parameter being the first value. In some examples, a power consumption by the UE 815 based on the PDCCH monitoring parameter being the second value may be greater than a power consumption by the UE 815 based on the PDCCH monitoring parameter being the first value.

In some examples, the BS 805 may configure a first number of PDCCH candidates for the UE to monitor for the PDCCH signal, and the PDCCH monitoring configuration update may indicate a second number of PDCCH candidates for the UE to monitor. The BS 805 may configure a CORESET and instantiate a plurality of SSs from the CORESET. Each SS of the plurality of SSs may be associated with at least one of a different time or a different aggregation level relative to each other, and each SS of the plurality of SSs may be identified by a different SS identifier. The BS 805 may select, based on a PDCCH candidate index per aggregation level, an aggregation level corresponding to a CCE, a CCE index, a SS ID, or a SS type, the second number of PDCCH candidates for the UE to monitor. Some examples of search space type may include common search spaces (CSS) of various DCI formats and/or UE-specific search spaces (USS) of various DCI formats.

In some examples, the BS 805 may configure a number of CCEs for the UE to monitor for the PDCCH signal, and the PDCCH monitoring configuration update may indicate a second number of CCEs for the UE to monitor. The BS 805 may configure a CORESET and instantiate a plurality of SSs from the CORESET. Each SS of the plurality of SSs may be associated with at least one of a different time or a different aggregation level relative to each other, and each SS of the plurality of SSs may be identified by a different SS identifier. The BS 805 may select, based on a PDCCH candidate index per aggregation level, an aggregation level corresponding to a CCE, a CCE index, a SS ID, or a SS type, the second number of CCEs for the UE to monitor.

At action 830, the BS 805 may transmit a PDCCH monitoring configuration update for the PDCCH monitoring parameter, the update specifying that the first value for the PDCCH monitoring parameter has been updated to the second value. The BS 805 may transmit the PDCCH monitoring configuration update via at least one of, for example, a MAC-CE, an RRC message, or DCI. At action 840, the UE 815 may monitor PDCCH based on the updated PDCCH monitoring parameter. At action 850, the BS 805 may transmit a PDCCH signal based on the updated PDCCH monitoring parameter.

In some examples, the PDCCH monitoring configuration may include an explicit indication of a subset of a PDCCH candidates and/or a subset of CCEs that is less than a number of PDCCH candidates and/or CCEs previously configured for a CORESET. In some example, the PDCCH monitoring configuration may include an implicit indication indicating a set of PDCCH candidate indices per AL, an AL, a set of CCE indices associated with a CORESET ID, a SS ID, and/or a SS type. In some examples, PDCCH candidates with lower PDCCH candidate indices in a certain AL may have a higher priority than PDCCH candidate with higher PDCCH indices, lower SS ID, and/or SS with type of CSS. In some instances, the BS may select the PDCCH candidates based on priorities of the PDCCH candidates.

In some examples, the PDCCH monitoring configuration update specifies the PDCCH monitoring parameter for a first BWP (e.g., using an identifier of the first BWP) to indicate the PDCCH monitoring parameter applies to the first BWP. The UE 815 may monitor PDCCH in the first BWP based on the updated PDCCH monitoring parameter, and the BS 805 may transmit PDCCH signal in the first BWP.

In some examples, the PDCCH monitoring configuration update specifies the PDCCH monitoring parameter for a currently active DL BWP to indicate the PDCCH monitoring parameter applies to the currently active DL BWP. The BS 805 may transmit the PDCCH monitoring configuration update in the currently active DL BWP. The UE 815 may monitor PDCCH in the currently active DL BWP based on the updated PDCCH monitoring parameter, and the BS 805 may transmit PDCCH signal in the currently active DL BWP.

In some examples, the PDCCH monitoring configuration update specifies the PDCCH monitoring parameter for a set of BWPs (e.g., all the BWPs assigned to the UE 815) to indicate the PDCCH monitoring parameter applies to the set of BWPs. The UE 815 may monitor PDCCH in the set of BWPs based on the updated PDCCH monitoring parameter, and the BS 805 may transmit PDCCH signal in at least one (or all) of the set of BWPs.

Figure 9:
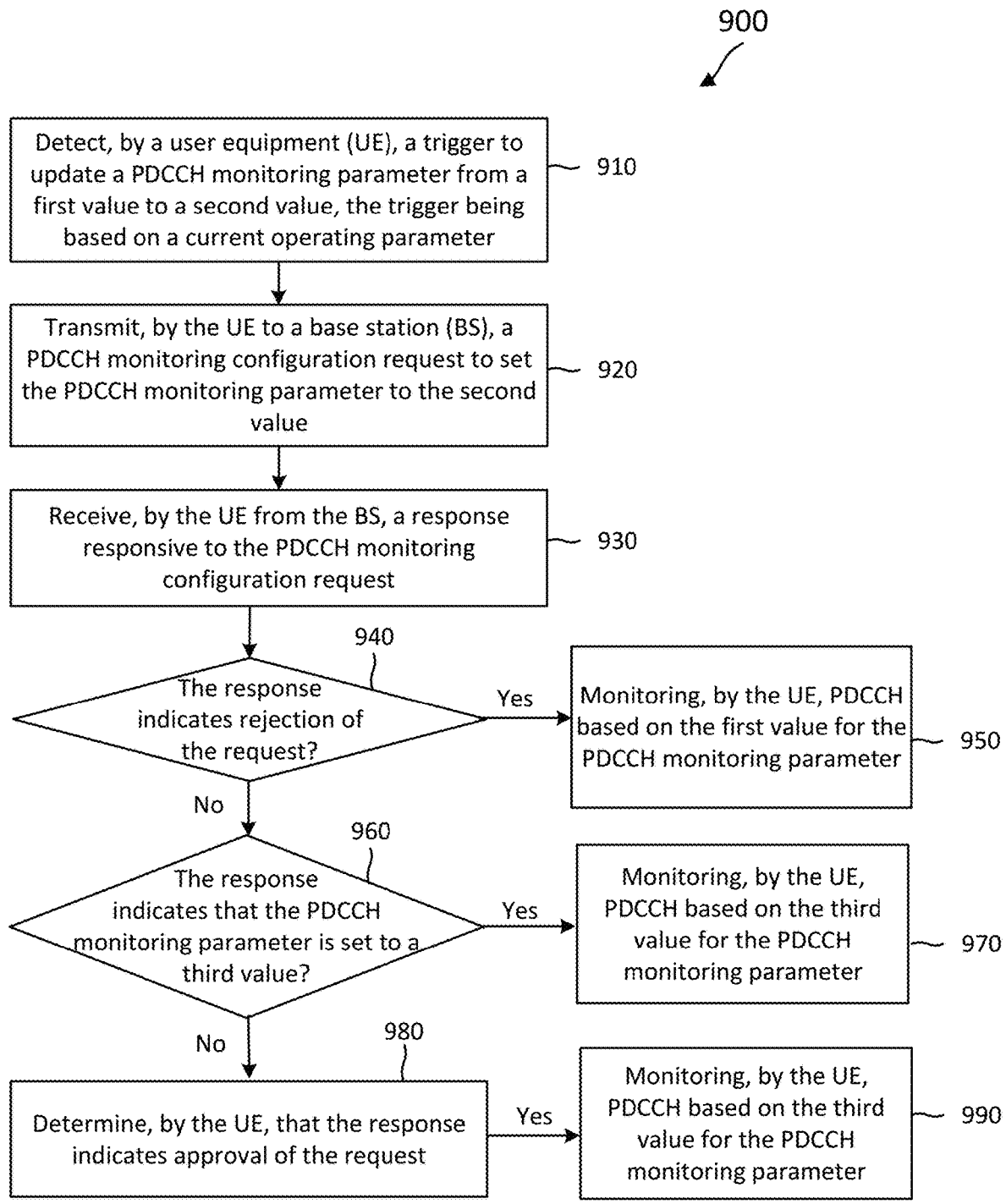
FIG. 9 is a flow diagram of a wireless communication method according to one or more aspects of the present disclosure.

FIG. 9 is a flow diagram of a wireless communication method 900 according to one or more aspects of the present disclosure. Aspects of the method 900 can be executed by a computing device (e.g., a processor, processing circuit, and/or other suitable component) of a wireless communication device or other suitable means for executing the blocks. For example, a wireless communication device, such as the UEs 115, 600, 715, and/or 815, may utilize one or more components, such as the processor 502, the memory 504, the PDCCH update module 508, monitoring module 509, the transceiver 510, the modem 512, and the one or more antennas 516, to execute the blocks of method 900. The method 900 may employ similar mechanisms as discussed in relation to FIGS. 1, 2, 3, 4, 5, 6, 7, 8 and/or 10. As illustrated, the method 900 includes a number of enumerated blocks, but aspects of the method 900 may include additional blocks before, after, and in between the enumerated blocks. In some aspects, one or more of the enumerated blocks may be omitted or performed in a different order.

At block 910, a UE (e.g., the UEs 115, 600, 715, and/or 815) detects a trigger to update a PDCCH monitoring parameter from a first value to a second value, the trigger being based on a current operating parameter. In some instances, the UE may utilize one or more components, such as the processor 502, the memory 504, the PDCCH update module 508, monitoring module 509, the transceiver 510, the modem 512, and the one or more antennas 516, to detect the trigger to update the PDCCH monitoring parameter from the first value to the second value.

At block 920, the UE transmits to a BS, a PDCCH monitoring configuration request to set the PDCCH monitoring parameter to the second value.

At block 930, the UE receives from the BS, a response responsive to the PDCCH monitoring configuration request.

At block 940, the UE determines whether the response indicates rejection of the request. If so, process flow proceeds to block 950, in which the UE monitors PDCCH based on the first value for the PDCCH monitoring parameter. If not, process flow proceeds to block 960, in which the UE determines whether the response indicates that the PDCCH monitoring parameter is set to a third value. If so, process flow proceeds to block 970, in which the UE monitors PDCCH based on the third value for the PDCCH monitoring parameter. If not, process flow proceeds to block 980, in which the UE determines that the response indicates acceptance of the request. At block 990, the UE monitors PDCCH based on the second value for the PDCCH monitoring parameter.

Figure 10:
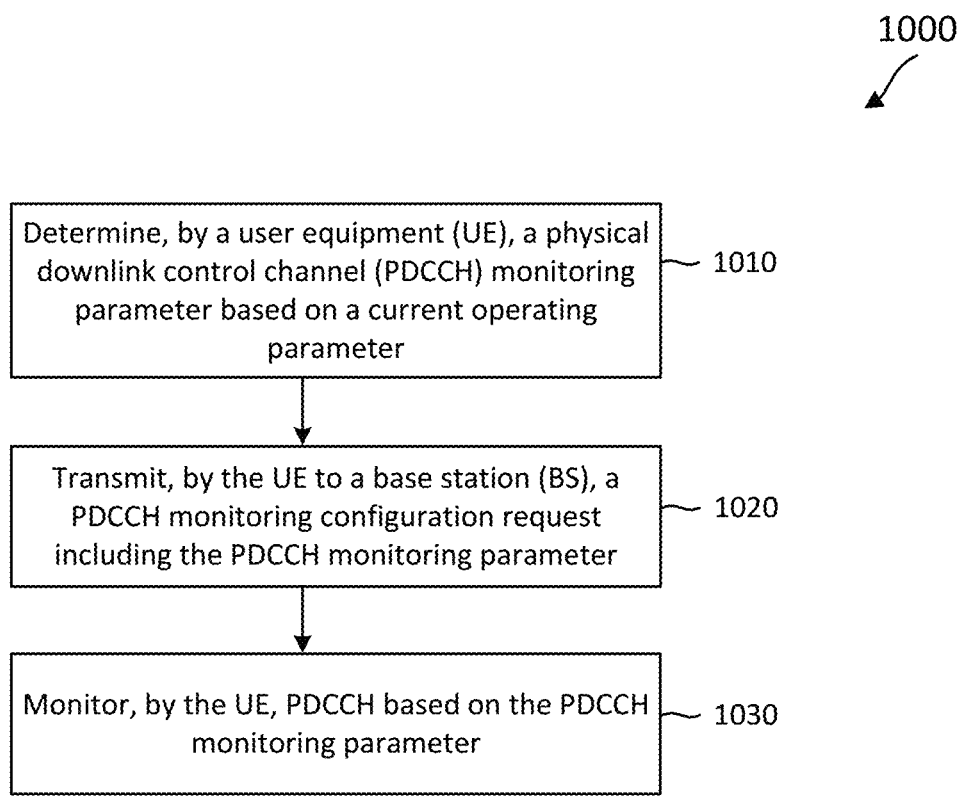
FIG. 10 is a flow diagram of a wireless communication method according to one or more aspects of the present disclosure.

FIG. 10 is a flow diagram of a wireless communication method 1000 according to one or more aspects of the present disclosure. Aspects of the method 1000 can be executed by a computing device (e.g., a processor, processing circuit, and/or other suitable component) of a wireless communication device or other suitable means for executing the blocks. For example, a wireless communication device, such as the UEs 115, 500, 715, and/or 815, may utilize one or more components, such as the processor 502, the memory 504, the PDCCH update module 508, monitoring module 509, the transceiver 510, the modem 512, and the one or more antennas 516, to execute the blocks of method 1000. The method 1000 may employ similar mechanisms as discussed in relation to FIGS. 1, 2, 3, 4, 5, 7, 8, and/or 9. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1010, a UE (e.g., the UEs 115, 500, 715, and/or 815) determines a PDCCH monitoring parameter based on a current operating parameter. In some instances, the UE may utilize one or more components, such as the processor 502, the memory 504, the PDCCH update module 508, monitoring module 509, the transceiver 510, the modem 512, and the one or more antennas 516, to determine a PDCCH monitoring parameter based on a current operating parameter.

The current operating parameter may be related to current operations at the UE. For example, the current operating parameter may include at least one of channel characteristics experienced by the UE, battery usage at the UE, a remaining battery life at the UE, or traffic patterns at the UE. In some examples, the PDCCH monitoring parameter may include a maximum number of monitored PDCCH candidates per-slot that is supported by the UE, a maximum number of monitored PDCCH candidates per-span that is supported by the UE, a maximum number of non-overlapping CCEs per-slot that is supported by the UE, and/or a maximum number of non-overlapping CCEs per-span that is supported by the UE. The span may have a periodicity and a duration specifying a period of time defined in terms of symbols. The BS may configure the span.

In some examples, the UE transmits a capability report of the UE to the BS, where the capability report specifies a first value for the PDCCH monitoring parameter. The PDCCH monitoring configuration request may specify a second value for the PDCCH monitoring parameter, and the first value may be different from the second value.

At block 1020, the UE transmits to a BS, a PDCCH monitoring configuration request including the PDCCH monitoring parameter. In some instances, the UE may utilize one or more components, such as the processor 502, the memory 504, the PDCCH update module 508, monitoring module 509, the transceiver 510, the modem 512, and the one or more antennas 516, to determine a transmit to the BS, a PDCCH monitoring configuration request including the PDCCH monitoring parameter. The UE may transmit the PDCCH monitoring configuration request via a MAC-CE, an RRCE message, and/or an UCI.

At block 1030, the UE monitors PDCCH based on the PDCCH monitoring parameter. In some instances, the UE may utilize one or more components, such as the processor 502, the memory 504, the PDCCH update module 508, monitoring module 509, the transceiver 510, the modem 512, and the one or more antennas 516, to monitor PDCCH based on the PDCCH monitoring parameter.

The UE may receive a response to the PDCCH monitoring configuration request. The response may indicate acceptance of the PDCCH monitoring configuration request, may indicate rejection of the PDCCH monitoring configuration request, and/or may specify a second value for the PDCCH monitoring parameter. If the response specifies a second value for the PDCCH monitoring parameter, the UE may monitor PDCCH based on the second value for the PDCCH monitoring parameter.

Figure 11:
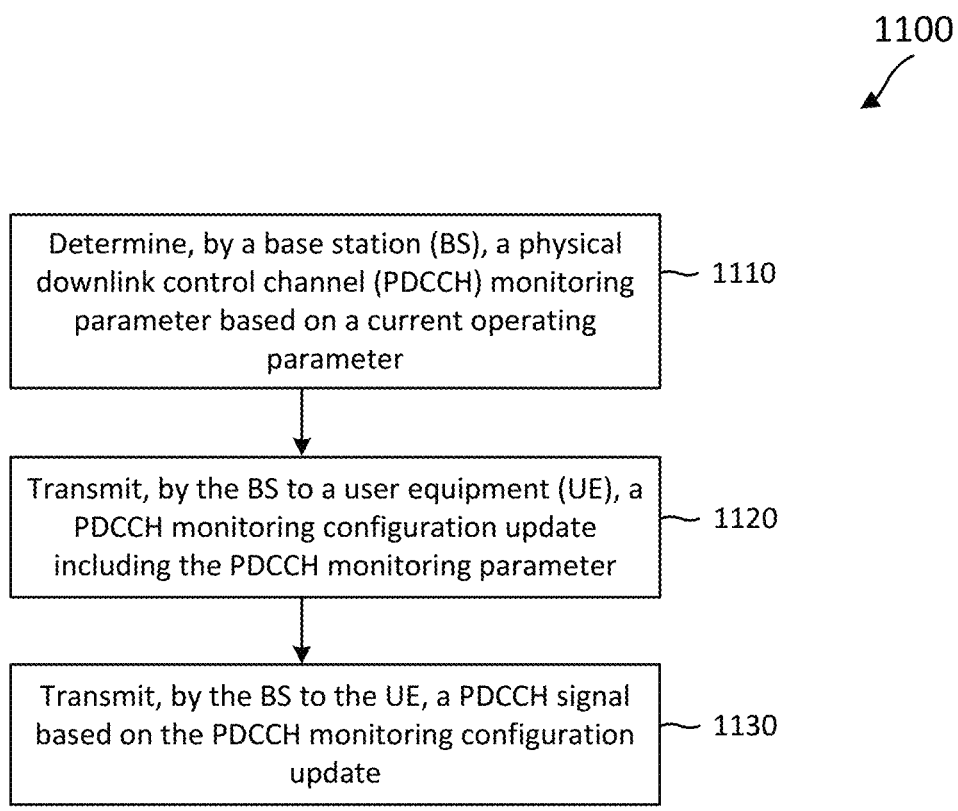
FIG. 11 is a flow diagram of a wireless communication method according to one or more aspects of the present disclosure.

FIG. 11 is a flow diagram of a wireless communication method 1100 according to one or more aspects of the present disclosure. Aspects of the method 1100 can be executed by a computing device (e.g., a processor, processing circuit, and/or other suitable component) of a wireless communication device or other suitable means for executing the blocks. For example, a wireless communication device, such as the BSs 105, 600, 705, and/or 805, may utilize one or more components, such as the processor 602, the memory 604, the PDCCH update module 608, monitoring module 609, the transceiver 610, the modem 612, and the one or more antennas 616, to execute the blocks of method 1100. The method 1100 may employ similar mechanisms as discussed in relation to FIGS. 1, 2, 3, 4, 6, 7, and/or 8. As illustrated, the method 1100 includes a number of enumerated blocks, but aspects of the method 1100 may include additional blocks before, after, and in between the enumerated blocks. In some aspects, one or more of the enumerated blocks may be omitted or performed in a different order.

At block 1110, a BS (e.g., the BSs 105, 600, 705, and/or 805) determines a PDCCH monitoring parameter based on a current operating parameter. In some instances, the BS may utilize one or more components, such as the processor 602, the memory 604, the PDCCH update module 608, monitoring module 609, the transceiver 610, the modem 612, and the one or more antennas 516, to determine a PDCCH monitoring parameter based on a current operating parameter.

The current operating parameter may be related to current operations at the UE. For example, the current operating parameter may include at least one of channel characteristics experienced by the UE, battery usage at the UE, a remaining battery life at the UE, or traffic patterns at the UE. In some examples, the PDCCH monitoring parameter may include a maximum number of monitored PDCCH candidates per-slot that is supported by the UE, a maximum number of monitored PDCCH candidates per-span that is supported by the UE, a maximum number of non-overlapping CCEs per-slot that is supported by the UE, and/or a maximum number of non-overlapping CCEs per-span that is supported by the UE. The span may have a periodicity and a duration specifying a period of time defined in terms of symbols. The BS may configure the span.

At block 1120, the BS transmits to a UE, a PDCCH monitoring configuration update including the PDCCH monitoring parameter. In some instances, the BS may utilize one or more components, such as the processor 602, the memory 604, the PDCCH update module 608, monitoring module 609, the transceiver 610, the modem 612, and the one or more antennas 616, to determine a transmit to the UE, a PDCCH monitoring configuration update including the PDCCH monitoring parameter. The BS may transmit the PDCCH monitoring configuration update by transmitting the update via a MAC-CE, an RRC message, and/or DCI.

In some examples, the BS receives from the UE, a PDCCH monitoring configuration request including the PDCCH monitoring parameter. The BS may transmit the PDCCH monitoring configuration update responsive to receiving the PDCCH monitoring configuration request. In some examples, the BS may receive from the UE, a capability report of the UE. The capability report may specify a first value for the PDCCH monitoring parameter, and the PDCCH monitoring configuration update may specify a second value for the PDCCH monitoring parameter. The first value may be different from the second value. For example, the first value may be greater than or less than the second value.

At block 1130, the BS transmits to the UE, a PDCCH signal based on the PDCCH monitoring configuration update. In some instances, the BS may utilize one or more components, such as the processor 602, the memory 604, the PDCCH update module 608, monitoring module 609, the transceiver 610, the modem 612, and the one or more antennas 616, to transmit a PDCCH signal based on the PDCCH monitoring configuration update.

In some aspects, the PDCCH monitoring configuration update specifies the PDCCH monitoring parameter for a first BWP, and the BS transmits the PDCCH signal in the first BWP. In some aspects, the BS transmits the PDCCH monitoring configuration update in a currently active DL BWP, and the PDCCH monitoring configuration update specifies the PDCCH monitoring parameter for the currently active DL BWP. The BS may transmit the PDCCH signal in the currently active DL BWP. In some aspects, the PDCCH monitoring configuration update specifies the PDCCH monitoring parameter for a set of BWPs in which PDCCH is transmitted to the UE, and wherein the BS transmits the PDCCH signal in at least one BWP of the set of BWPs.

In some aspects, the BS may configure a first number of PDCCH candidates for the UE to monitor for the PDCCH signal. The PDCCH monitoring configuration update may indicate a second number of PDCCH candidates for the UE to monitor. The BS may configure a CORESET and instantiate a plurality of search spaces from the CORESET. Each SS of the plurality of SSs is associated with at least one of a different time or a different aggregation level relative to each other, and each SS of the plurality of SSs may be identified by a different SS identifier. The BS may select, based on a PDCCH candidate index per aggregation level, an aggregation level corresponding to a CCE, a CCE index, a search space ID, or a search space type, the second number of PDCCH candidates for the UE to monitor.

In some aspects, the BS may configure a number of CCEs for the UE to monitor for the PDCCH signal. The PDCCH monitoring configuration update may indicate a second number of CCEs for the UE to monitor. The BS may configure a CORESET and instantiate a plurality of SSs from the CORESET. Each SS of the plurality of SSs may be associated with at least one of a different time or a different aggregation level relative to each other, and each SS of the plurality of SSs may be identified by a different search space identifier. The BS may select, based on a PDCCH candidate index per aggregation level, an aggregation level corresponding to a CCE, a CCE index, a search space ID, or a search space type, the second number of CCEs for the UE to monitor.

In some aspects, the BS may configure a first number for the PDCCH monitoring parameter and select, based on a rule, a second number for the PDCCH monitoring parameter. The rule may be based on at least one of a set of one or more PDCCH candidate indices per aggregation level, an aggregation level, a set of one or more CCE indices, a SS ID, or a SS type. In an example, the first number for the PDCCH monitoring parameter may specify the first number of PDCCH candidates, and the second number for the PDCCH monitoring parameter may specify the second number of PDCCH candidates. In another example, the first number for the PDCCH monitoring parameter may specify the first number of CCEs, and the second number for the PDCCH monitoring parameter may specify the second number of CCEs.

In some aspects, a method of wireless communication includes: determining, by a user equipment (UE), a physical downlink control channel (PDCCH) monitoring parameter based on a current operating parameter; transmitting, by the UE to a base station (BS), a PDCCH monitoring configuration request including the PDCCH monitoring parameter; and monitoring, by the UE, PDCCH based on the PDCCH monitoring parameter. In some examples, the method of wireless communication further includes transmitting, by the UE to the BS, a capability report of the UE, the capability report specifying a first value for the PDCCH monitoring parameter, the PDCCH monitoring configuration request specifying a second value for the PDCCH monitoring parameter, and the first value being different than the second value. In some cases, the PDCCH monitoring parameter includes a maximum number of monitored PDCCH candidates per-slot that is supported by the UE. In some cases, the PDCCH monitoring parameter includes a maximum number of monitored PDCCH candidates per-span that is supported by the UE, the span having a periodicity and a duration specifying a period of time defined in terms of symbols. The span may be configurable.

In some examples, the PDCCH monitoring parameter includes a maximum number of non-overlapping control channel elements (CCEs) per-slot that is supported by the UE. In some examples, the PDCCH monitoring parameter includes a maximum number of non-overlapping CCEs per-span that is supported by the UE, the span having a periodicity and a duration specifying a period of time defined in terms of symbols. The span may be configurable. In some examples, transmitting the PDCCH monitoring configuration request includes transmitting the PDCCH monitoring configuration request via a media access control-control element (MAC-CE). In some examples, transmitting the PDCCH monitoring configuration request includes transmitting the PDCCH monitoring configuration request via a radio resource control (RRC) message. In some examples, transmitting the PDCCH monitoring configuration request includes transmitting the PDCCH monitoring configuration request via an uplink control information (UCI).

In some examples, the method of wireless communication further includes receiving, by the UE from the BS, a response to the PDCCH monitoring configuration request. In some cases, the response indicates acceptance of the PDCCH monitoring configuration request. In some cases, the response indicates rejection of the PDCCH monitoring configuration request. In some cases, the response specifies a second value for the PDCCH monitoring parameter, where monitoring the PDCCH based on the PDCCH monitoring parameter includes monitoring PDCCH based on the second value for the PDCCH monitoring parameter. In some examples, the current operating parameter is related to current operations at the UE. In some cases, the current operating parameter includes channel characteristics. In some cases, the current operating parameter includes battery usage at the UE. In some cases, the current operating parameter includes a remaining battery life at the UE. In some cases, the current operating parameter includes traffic patterns at the UE.

In some aspects, a method of wireless communication includes: determining, by a base station (BS), a physical downlink control channel (PDCCH) monitoring parameter based on a current operating parameter; transmitting, by the BS to a user equipment (UE), a PDCCH monitoring configuration update including the PDCCH monitoring parameter; and transmitting, by the BS to the UE, a PDCCH signal based on the PDCCH monitoring configuration update. In some examples, the method of wireless communication further includes receiving, by the BS from the UE, a PDCCH monitoring configuration request including the PDCCH monitoring parameter, where transmitting the PDCCH monitoring configuration update includes transmitting the PDCCH monitoring configuration update responsive to receiving the PDCCH monitoring configuration request. In some examples, the method of wireless communication further includes receiving, by the BS from the UE, a capability report of the UE, the capability report specifying a first value for the PDCCH monitoring parameter, the PDCCH monitoring configuration update specifying a second value for the PDCCH monitoring parameter, and the first value being different than the second value.

In some cases, the PDCCH monitoring parameter includes a maximum number of monitored PDCCH candidates per-slot for the UE. In some cases, the PDCCH monitoring parameter includes a maximum number of monitored PDCCH candidates per-span for the UE, the span having a periodicity and a duration specifying a period of time defined in terms of symbols. In some cases, the PDCCH monitoring parameter includes a maximum number of non-overlapping control channel elements (CCEs) per-slot for the UE. In some cases, the PDCCH monitoring parameter includes a maximum number of non-overlapping CCEs per-span for the UE, the span having a periodicity and a duration specifying a period of time defined in terms of symbols.

In some examples, transmitting the PDCCH monitoring configuration update includes transmitting the PDCCH monitoring configuration update via a media access control-control element (MAC-CE). In some examples, transmitting the PDCCH monitoring configuration update includes transmitting the PDCCH monitoring configuration update via a radio resource control (RRC) message. In some examples, transmitting the PDCCH monitoring configuration update includes transmitting the PDCCH monitoring configuration update via a downlink control information (DCI). In some examples, transmitting the PDCCH monitoring configuration update includes specifying the PDCCH monitoring parameter for a first bandwidth part (BWP), where transmitting the PDCCH signal includes transmitting the PDCCH signal in the first BWP.

In some cases, transmitting the PDCCH monitoring configuration update includes transmitting the PDCCH monitoring configuration update in a currently active downlink (DL) BWP, the PDCCH monitoring configuration update specifying the PDCCH monitoring parameter for the currently active DL BWP, where transmitting the PDCCH signal includes transmitting the PDCCH signal in the currently active DL BWP. In some cases, transmitting the PDCCH monitoring configuration update includes specifying the PDCCH monitoring parameter for a set of BWPs in which PDCCH is transmitted to the UE, where transmitting the PDCCH signal includes transmitting the PDCCH signal in at least one BWP of the set of BWPs.

In some examples, the method of wireless communication further includes configuring, by the BS, a first number of PDCCH candidates for the UE to monitor for the PDCCH signal, where the PDCCH monitoring configuration update indicates a second number of PDCCH candidates for the UE to monitor. In some cases, the method of wireless communication further includes: configuring, by the BS, a control resource set (CORESET); instantiating, by the BS, a plurality of search spaces from the CORESET, each search space of the plurality being associated with at least one of a different time or a different aggregation level relative to each other, and each search space of the plurality being identified by a different search space identifier; and selecting, based on a PDCCH candidate index per aggregation level, an aggregation level corresponding to a CCE, a CCE index, a search space ID, or a search space type, the second number of PDCCH candidates for the UE to monitor. In some cases, the method of wireless communication further includes configuring, by the BS, a number of CCEs for the UE to monitor for the PDCCH signal, where the PDCCH monitoring configuration update indicates a second number of CCEs for the UE to monitor. In some cases, the method of wireless communication further includes: configuring, by the BS, a control resource set (CORESET); instantiating, by the BS, a plurality of search spaces from the CORESET, each search space of the plurality being associated with at least one of a different time or a different aggregation level relative to each other, and each search space of the plurality being identified by a different search space identifier; and selecting, based on a PDCCH candidate index per aggregation level, an aggregation level corresponding to a CCE, a CCE index, a search space ID, or a search space type, the second number of CCEs for the UE to monitor.

In some examples, the method of wireless communication further includes: configuring, by the BS, a first number for the PDCCH monitoring parameter; and selecting, based on a rule, a second number for the PDCCH monitoring parameter. In some cases, the rule is based on at least one of a set of one or more PDCCH candidate indices per aggregation level, an aggregation level, a set of one or more CCE indices, a search space ID, or a search space type. In some cases, the first number for the PDCCH monitoring parameter specifies the first number of PDCCH candidates, and the second number for the PDCCH monitoring parameter specifies the second number of PDCCH candidates. In some cases, the first number for the PDCCH monitoring parameter specifies the first number of CCEs, and the second number for the PDCCH monitoring parameter specifies the second number of CCEs.

In some aspects, an apparatus includes: a memory; a processor coupled with the memory and configured to, when executing instructions stored on the memory, cause the apparatus to: determine, by a user equipment (UE), a physical downlink control channel (PDCCH) monitoring parameter based on a current operating parameter; and monitor, by the UE, PDCCH based on the PDCCH monitoring parameter; and a transceiver configured to transmit, by the UE to a base station (BS), a PDCCH monitoring configuration request including the PDCCH monitoring parameter. In some examples, the transceiver is configured to: transmit, by the UE to the BS, a capability report of the UE, where the capability report specifies a first value for the PDCCH monitoring parameter, the PDCCH monitoring configuration request specifies a second value for the PDCCH monitoring parameter, and the first value is different from the second value. In some cases, the PDCCH monitoring parameter includes a maximum number of monitored PDCCH candidates per-slot that is supported by the UE. In some cases, the PDCCH monitoring parameter includes a maximum number of monitored PDCCH candidates per-span that is supported by the UE, where the span has a periodicity and a duration specifying a period of time defined in terms of symbols. In some cases, the PDCCH monitoring parameter includes a maximum number of non-overlapping control channel elements (CCEs) per-slot that is supported by the UE. In some cases, the PDCCH monitoring parameter includes a maximum number of non-overlapping CCEs per-span that is supported by the UE, where the span has a periodicity and a duration specifying a period of time defined in terms of symbols.

In some examples, the transceiver is configured to transmit the PDCCH monitoring configuration request via a media access control-control element (MAC-CE), a radio resource control (RRC) message, or an uplink control information (UCI). In some examples, the transceiver is configured to receive, by the UE from the BS, a response to the PDCCH monitoring configuration request. In some cases, the response indicates acceptance of the PDCCH monitoring configuration request. In some cases, the response indicates rejection of the PDCCH monitoring configuration request. In some cases, the response specifies a second value for the PDCCH monitoring parameter, where the processor, when executing instructions stored on the memory, causes the apparatus to monitor the PDCCH based on the second value for the PDCCH monitoring parameter. In some examples, the current operating parameter is related to current operations at the UE. In some cases, the current operating parameter includes at least one of channel characteristics, battery usage at the UE, a remaining battery life at the UE, or traffic patterns at the UE.

In some aspects, an apparatus includes: a memory; a processor coupled with the memory and configured to, when executing instructions stored on the memory, cause the apparatus to: determine, by a base station (BS), a physical downlink control channel (PDCCH) monitoring parameter based on a current operating parameter; and a transceiver configured to: transmit, by the BS to a user equipment (UE), a PDCCH monitoring configuration update including the PDCCH monitoring parameter; and transmit, by the BS to the UE, a PDCCH signal based on the PDCCH monitoring configuration update. In some examples, the transceiver is configured to: receive, by the BS from the UE, a PDCCH monitoring configuration request including the PDCCH monitoring parameter; and transmit the PDCCH monitoring configuration update responsive to receiving the PDCCH monitoring configuration request. In some examples, the transceiver is configured to: receive, by the BS from the UE, a capability report of the UE, where the capability report specifies a first value for the PDCCH monitoring parameter, the PDCCH monitoring configuration update specifies a second value for the PDCCH monitoring parameter, and the first value is different from than the second value. In some cases, the PDCCH monitoring parameter includes a maximum number of monitored PDCCH candidates per-slot for the UE. In some cases, the PDCCH monitoring parameter includes a maximum number of monitored PDCCH candidates per-span for the UE, where the span has a periodicity and a duration specifying a period of time defined in terms of symbols. In some cases, the PDCCH monitoring parameter includes a maximum number of non-overlapping control channel elements (CCEs) per-slot for the UE.

In some examples, the PDCCH monitoring parameter includes a maximum number of non-overlapping CCEs per-span for the UE, where the span has a periodicity and a duration specifying a period of time defined in terms of symbols. In some cases, the transceiver is configured to: transmit the PDCCH monitoring configuration update via a media access control-control element (MAC-CE), a radio resource control (RRC) message, or a downlink control information (DCI). In some cases, the transceiver is configured to: transmit the PDCCH signal in a first bandwidth part (BWP), wherein the PDCCH monitoring configuration update specifies the PDCCH monitoring parameter for the first BWP. In some cases, the transceiver is configured to: transmit the PDCCH monitoring configuration update in a currently active downlink (DL) BWP, where the PDCCH monitoring configuration update specifies the PDCCH monitoring parameter for the currently active DL BWP; and transmit the PDCCH signal in the currently active DL BWP. In some examples, the transceiver is configured to transmit the PDCCH signal in at least one BWP of a set of BWPs, where the PDCCH monitoring configuration update specifies the PDCCH monitoring parameter for the set of BWPs in which PDCCH is transmitted to the UE.

In some examples, the processor, when executing instructions stored on the memory, causes the apparatus to: configure, by the BS, a first number of PDCCH candidates for the UE to monitor for the PDCCH signal, where the PDCCH monitoring configuration update indicates a second number of PDCCH candidates for the UE to monitor. In some cases, the processor, when executing instructions stored on the memory, causes the apparatus to: configure, by the BS, a control resource set (CORESET); instantiate, by the BS, a plurality of search spaces from the CORESET, where each search space of the plurality is associated with at least one of a different time or a different aggregation level relative to each other, and each search space of the plurality is identified by a different search space identifier; and select, based on a PDCCH candidate index per aggregation level, an aggregation level corresponding to a CCE, a CCE index, a search space ID, or a search space type, the second number of PDCCH candidates for the UE to monitor.

In some examples, the processor, when executing instructions stored on the memory, causes the apparatus to: configure, by the BS, a number of CCEs for the UE to monitor for the PDCCH signal, where the PDCCH monitoring configuration update indicates a second number of CCEs for the UE to monitor. In some cases, the processor, when executing instructions stored on the memory, causes the apparatus to: configure, by the BS, a control resource set (CORESET); instantiate, by the BS, a plurality of search spaces from the CORESET, where each search space of the plurality is associated with at least one of a different time or a different aggregation level relative to each other, and each search space of the plurality is identified by a different search space identifier; and select, based on a PDCCH candidate index per aggregation level, an aggregation level corresponding to a CCE, a CCE index, a search space ID, or a search space type, the second number of CCEs for the UE to monitor. In some examples, the processor, when executing instructions stored on the memory, causes the apparatus to: configure, by the BS, a first number for the PDCCH monitoring parameter; and select, based on a rule, a second number for the PDCCH monitoring parameter. In some cases, the rule is based on at least one of a set of one or more PDCCH candidate indices per aggregation level, an aggregation level, a set of one or more CCE indices, a search space ID, or a search space type. In some cases, the first number for the PDCCH monitoring parameter specifies the first number of PDCCH candidates, and the second number for the PDCCH monitoring parameter specifies the second number of PDCCH candidates. In some cases, the first number for the PDCCH monitoring parameter specifies the first number of CCEs, and the second number for the PDCCH monitoring parameter specifies the second number of CCEs.

In some aspects, a computer-readable medium having program code recorded thereon, the program code including: code for causing a user equipment (UE) to determine a physical downlink control channel (PDCCH) monitoring parameter based on a current operating parameter; code for causing the UE to transmit to a base station (BS), a PDCCH monitoring configuration request including the PDCCH monitoring parameter; and code for causing the UE to monitor, by the UE, PDCCH based on the PDCCH monitoring parameter.

In some examples, the PDCCH monitoring parameter includes at least one of a maximum number of monitored PDCCH candidates per-slot that is supported by the UE, a maximum number of monitored PDCCH candidates per-span that is supported by the UE, a maximum number of non-overlapping control channel elements (CCEs) per-slot that is supported by the UE, or a maximum number of non-overlapping CCEs per-span that is supported by the UE, the span having a periodicity and a duration specifying a period of time defined in terms of symbols, where the span has a periodicity and a duration specifying a period of time defined in terms of symbols.

In some aspects, a computer-readable medium having program code recorded thereon, the program code including: code for causing a base station (BS) to determine a physical downlink control channel (PDCCH) monitoring parameter based on a current operating parameter; code for causing the BS to transmit to a user equipment (UE), a PDCCH monitoring configuration update including the PDCCH monitoring parameter; and code for causing the BS to transmit to the UE, a PDCCH signal based on the PDCCH monitoring configuration update. In some examples, the PDCCH monitoring parameter includes at least one of a maximum number of monitored PDCCH candidates per-slot that is supported by the UE, a maximum number of monitored PDCCH candidates per-span that is supported by the UE, a maximum number of non-overlapping control channel elements (CCEs) per-slot that is supported by the UE, or a maximum number of non-overlapping CCEs per-span that is supported by the UE, the span having a periodicity and a duration specifying a period of time defined in terms of symbols, where the span has a periodicity and a duration specifying a period of time defined in terms of symbols.

In some aspects, an apparatus includes: means for determining, by a user equipment (UE), a physical downlink control channel (PDCCH) monitoring parameter based on a current operating parameter; means for transmitting, by the UE to a base station (BS), a PDCCH monitoring configuration request including the PDCCH monitoring parameter; and means for monitoring, by the UE, PDCCH based on the PDCCH monitoring parameter.

In some aspects, an apparatus includes: means for determining, by a base station (BS), a physical downlink control channel (PDCCH) monitoring parameter based on a current operating parameter; means for transmitting, by the BS to a user equipment (UE), a PDCCH monitoring configuration update including the PDCCH monitoring parameter; and means for transmitting, by the BS to the UE, a PDCCH signal based on the PDCCH monitoring configuration update.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), comprising:
   transmitting, to a network unit, a capability report of the UE, the capability report specifying a first value for a physical downlink control channel (PDCCH) monitoring parameter, wherein the PDCCH monitoring parameter is one of a maximum number of monitored PDCCH candidates or a maximum number of non-overlapping control channel elements (CCEs);
   transmitting, to the network unit in response to a trigger based on a current operating parameter of the UE, a PDCCH monitoring configuration request including a second value for the PDCCH monitoring parameter less than the first value based on the current operating parameter of the UE;
   receiving, from the network unit, a response to the PDCCH monitoring configuration request including a third value for the PDCCH monitoring parameter different than the second value, wherein the response includes an indication indicating a set of selected PDCCH candidate indices based on priorities of PDCCH candidates associated with a PDCCH candidate index; and
   monitoring for a PDCCH using the third value for the PDCCH monitoring parameter.

2. The method of claim 1, wherein the PDCCH monitoring parameter includes a maximum number of monitored PDCCH candidates per-slot that is supported by the UE.

3. The method of claim 1, wherein the PDCCH monitoring parameter includes a maximum number of monitored PDCCH candidates for a span that is supported by the UE, the span having a periodicity and a duration specifying a period of time defined in terms of symbols.

4. The method of claim 1, wherein the PDCCH monitoring parameter includes a maximum number of non-overlapping control channel elements (CCEs) per-slot that is supported by the UE.

5. The method of claim 1, wherein the PDCCH monitoring parameter includes a maximum number of non-overlapping CCEs for a span that is supported by the UE, the span having a periodicity and a duration specifying a period of time defined in terms of symbols.

6. The method of claim 1, wherein the transmitting the PDCCH monitoring configuration request includes transmitting the PDCCH monitoring configuration request via a media access control-control element (MAC-CE), a radio resource control (RRC) message, or uplink control information (UCI).

7. The method of claim 1, wherein the current operating parameter is related to current operations at the UE.

8. The method of claim 7, wherein the current operating parameter includes at least one of channel characteristics, battery usage at the UE, a remaining battery life at the UE, or traffic patterns at the UE.

9. A user equipment (UE), comprising:
a memory;
a transceiver; and
at least one processor coupled to the memory and the transceiver, wherein the at least one processor is configured, alone or in any combination, to cause the UE to:
transmit, to a network unit, a capability report of the UE, the capability report specifying a first value for a physical downlink control channel (PDCCH) monitoring parameter, wherein the PDCCH monitoring parameter is one of a maximum number of monitored PDCCH candidates or a maximum number of non-overlapping control channel elements (CCEs);
transmit, to the network unit in response to a trigger based on a current operating parameter of the UE, a PDCCH monitoring configuration request including a second value for the PDCCH monitoring parameter less than the first value based on the current operating parameter of the UE;
receive a response to the PDCCH monitoring configuration request including a third value for the PDCCH monitoring parameter different than the second value, wherein the response includes an indication indicating a set of selected PDCCH candidate indices based on priorities of PDCCH candidates associated with a PDCCH candidate index; and
monitor for a PDCCH using the third value for the PDCCH monitoring parameter.

10. The UE of claim 9, wherein the PDCCH monitoring parameter includes a maximum number of monitored PDCCH candidates per-slot that is supported by the UE.

11. The UE of claim 9, wherein the PDCCH monitoring parameter includes a maximum number of monitored PDCCH candidates for a span that is supported by the UE, and wherein the span has a periodicity and a duration specifying a period of time defined in terms of symbols.

12. The UE of claim 9, wherein the PDCCH monitoring parameter includes a maximum number of non-overlapping control channel elements (CCEs) per-slot that is supported by the UE.

13. The UE of claim 9, wherein the PDCCH monitoring parameter includes a maximum number of non-overlapping CCEs for a span that is supported by the UE, and wherein the span has a periodicity and a duration specifying a period of time defined in terms of symbols.

14. The UE of claim 9, wherein the UE is further configured to:
transmit the PDCCH monitoring configuration request via a media access control-control element (MAC-CE), a radio resource control (RRC) message, or uplink control information (UCI).

15. The UE of claim 9, wherein the current operating parameter is related to current operations at the UE.

16. The UE of claim 15, wherein the current operating parameter includes at least one of channel characteristics, battery usage at the UE, a remaining battery life at the UE, or traffic patterns at the UE.

17. A non-transitory computer-readable medium having program code recorded thereon executable by one or more processors for wireless communication by a user equipment (UE), the program code comprising:
code for causing the UE to transmit, to a network unit, a capability report of the UE, the capability report specifying a first value for a physical downlink control channel (PDCCH) monitoring parameter, wherein the PDCCH monitoring parameter is one of a maximum number of monitored PDCCH candidates or a maximum number of non-overlapping control channel elements (CCEs);
code for causing the UE to transmit to the network unit in response to a trigger based on a current operating parameter of the UE, a PDCCH monitoring configuration request including a second value for the PDCCH monitoring parameter less than the first value based on the current operating parameter of the UE;
code for causing the UE to receive a response to the PDCCH monitoring configuration request including a third value for the PDCCH monitoring parameter different than the second value, wherein the response includes an indication indicating a set of selected PDCCH candidate indices based on priorities of PDCCH candidates associated with a PDCCH candidate index; and
code for causing the UE to monitor, for a PDCCH using the third value for the PDCCH monitoring parameter.

18. The non-transitory computer-readable medium of claim 17, wherein the PDCCH monitoring parameter includes at least one of a maximum number of monitored PDCCH candidates per-slot that is supported by the UE, a maximum number of monitored PDCCH candidates for a span that is supported by the UE, a maximum number of non-overlapping control channel elements (CCEs) per-slot that is supported by the UE, or a maximum number of non-overlapping CCEs for the span that is supported by the UE, the span having a periodicity and a duration specifying a period of time defined in terms of symbols.

19. The non-transitory computer-readable medium of claim 17, wherein the code for causing the UE to transmit the PDCCH monitoring configuration request includes program code causing the UE to transmit the PDCCH monitoring configuration request via a media access control-control element (MAC-CE), a radio resource control (RRC) message, or uplink control information (UCI).

20. The non-transitory computer-readable medium of claim 17, wherein the current operating parameter is related to current operations at the UE.

21. The non-transitory computer-readable medium of claim 20, wherein the current operating parameter includes at least one of channel characteristics, battery usage at the UE, a remaining battery life at the UE, or traffic patterns at the UE.

22. An apparatus, comprising:
means for transmitting, to a network unit, a capability report of a user equipment (UE), the capability report specifying a first value for a physical downlink control channel (PDCCH) monitoring parameter, wherein the PDCCH monitoring parameter is one of a maximum number of monitored PDCCH candidates or a maximum number of non-overlapping control channel elements (CCEs);
means for transmitting, by the UE to the network unit in response to a trigger based on a current operating parameter of the UE, a PDCCH monitoring configuration request including a second value for the PDCCH monitoring parameter less than the first value based on the current operating parameter of the UE;
means for receiving a response to the PDCCH monitoring configuration request including a third value for the PDCCH monitoring parameter different than the second value, wherein the response includes an indication indicating a set of selected PDCCH candidate indices based on priorities of PDCCH candidates associated with a PDCCH candidate index; and means for monitoring, by the UE, for a PDCCH using the third value for the PDCCH monitoring parameter.

* * * * *